US011962169B2

(12) United States Patent
Lee et al.

(10) Patent No.: US 11,962,169 B2
(45) Date of Patent: Apr. 16, 2024

(54) WIRELESS POWER TRANSMISSION DEVICE TRANSMITTING CHARGING POWER TO WIRELESS POWER RECEIVING DEVICE AND METHOD OF OPERATING THE SAME

(71) Applicant: SAMSUNG ELECTRONICS CO., LTD., Suwon-si (KR)

(72) Inventors: Chongmin Lee, Suwon-si (KR); Sungku Yeo, Suwon-si (KR); Kangho Byun, Suwon-si (KR); Jaesun Shin, Suwon-si (KR); Jeongman Lee, Suwon-si (KR); Hyoseok Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 72 days.

(21) Appl. No.: 17/580,186

(22) Filed: Jan. 20, 2022

(65) Prior Publication Data
US 2022/0311285 A1      Sep. 29, 2022

Related U.S. Application Data

(63) Continuation of application No. PCT/KR2021/018992, filed on Dec. 14, 2021.

(30) Foreign Application Priority Data

Mar. 24, 2021   (KR) ........................ 10-2021-0038210

(51) Int. Cl.
*H02J 50/90* (2016.01)
*H02J 50/12* (2016.01)
(Continued)

(52) U.S. Cl.
CPC .............. *H02J 50/90* (2016.02); *H02J 50/12* (2016.02); *H04B 5/0037* (2013.01); *H04W 4/80* (2018.02)

(58) Field of Classification Search
CPC ......... H02J 50/90; H04B 5/0037; H04W 4/80
See application file for complete search history.

(56) References Cited

U.S. PATENT DOCUMENTS

2011/0221389 A1   9/2011 Won et al.
2012/0163418 A1   6/2012 Ward
(Continued)

FOREIGN PATENT DOCUMENTS

KR   10-2011-0103296 A   9/2011
KR   10-2011-0134970 A   12/2011
(Continued)

OTHER PUBLICATIONS

International Search Report (PCT/ISA/210) dated Mar. 28, 2022 issued in International Application No. PCT/KR2021/018992.
(Continued)

*Primary Examiner* — Daniel Cavallari
(74) *Attorney, Agent, or Firm* — Sughrue Mion, PLLC

(57) ABSTRACT

An electronic device includes a power transmitter; a first communication interface configured to support an Ultra-Wideband (UWB) communication scheme; a second communication interface configured to support a Bluetooth communication scheme; and a processor configured to: control the first communication interface to transmit a first signal and receive a second signal corresponding to the first signal via the first communication interface, identify, based on a difference between a transmission time of the first signal and a reception time of the second signal, first location information of a first external device, control the power transmitter to transmit a first driving power having a first magnitude, based on a first distance between the first external device and the electronic device being within a first range, the first distance being identified based on the first location information, establish a Bluetooth communication connection with the first external device, based on receiving, via the second communication interface, a first packet transmitted from the first external device using the first driving power, after transmitting the first driving power, and control
(Continued)

the power transmitter to transmit a first charging power having a second magnitude, after establishing the Bluetooth communication connection.

20 Claims, 15 Drawing Sheets

(51) Int. Cl.
*H04B 5/00* (2006.01)
*H04W 4/80* (2018.01)

(56) References Cited

U.S. PATENT DOCUMENTS

| | | |
|---|---|---|
| 2018/0301937 A1 | 10/2018 | Park et al. |
| 2018/0316388 A1 | 11/2018 | Lee |
| 2019/0052114 A1 | 2/2019 | Lee et al. |
| 2020/0381958 A1 | 12/2020 | Wu et al. |
| 2021/0320681 A1 | 10/2021 | Baek et al. |
| 2022/0131424 A1* | 4/2022 | Charthad ............. H04B 13/005 |
| 2022/0217650 A1 | 7/2022 | Kim |
| 2023/0143950 A1 | 5/2023 | Choi et al. |

FOREIGN PATENT DOCUMENTS

| | | |
|---|---|---|
| KR | 10-2012-0097034 A | 9/2012 |
| KR | 10-2016-0041889 A | 4/2016 |
| KR | 10-1722768 B1 | 4/2017 |
| KR | 10-2017-0047820 A | 5/2017 |
| KR | 10-2019-0050059 A | 5/2019 |
| KR | 10-2020-0026633 A | 3/2020 |
| KR | 10-2020-0083112 A | 7/2020 |
| KR | 10-2021-0138781 A | 11/2021 |
| KR | 10-2022-0004842 A | 1/2022 |
| WO | 2010/057224 A1 | 5/2010 |

OTHER PUBLICATIONS

Written Opinion (PCT/ISA/237) dated Mar. 28, 2022 issued in International Application No. PCT/KR2021/018992.

* cited by examiner

WIRELESS POWER TRANSMISSION DEVICE TRANSMITTING CHARGING POWER TO WIRELESS POWER RECEIVING DEVICE AND METHOD OF OPERATING THE SAME

CROSS-REFERENCE TO RELATED APPLICATIONS

This application is a bypass continuation of International Application No. PCT/KR2021/018992 designating the United States, filed on Dec. 14, 2021, in the Korean Intellectual Property Receiving Office and claiming priority to Korean Patent Application No. 10-2021-0038210, filed on Mar. 24, 2021 in the Korean Intellectual Property Office, the disclosures of which are incorporated by reference herein in their entireties.

BACKGROUND

1. Field

The disclosure relates to a wireless power transmission device for transmitting charging power to a wireless power reception device, and an operation method thereof.

2. Description of Related Art

In a wireless power transmission system, according to a standard of a wireless power transmission field (e.g., air fuel alliance (AFA) standard), a wireless power transmission device may detect a wireless power reception device using detection power (e.g., a short-beacon), and may drive at least one element of the wireless power reception device using driving power (e.g., a long-beacon), so as to control a charging situation.

According to a wireless power provision method based on a resonance scheme, a wireless power transmission device and a wireless power reception device may be spaced apart from each other. Therefore, the wireless power reception device may not be detected by detection power according to the standard of the wireless power transmission field. In addition, if the wireless power transmission device continuously transmits detection power, the power of the wireless power transmission device may be wasted, which is a drawback.

Therefore, in order to transmit wireless power to a wireless power reception device which is spaced apart from a wireless power transmission device in a space, the wireless power transmission device may need to identify the location information of the wireless power reception device, and may need to identify whether the wireless power reception device is located in the charging area of the wireless power transmission device, and may need to identify wireless power transmission efficiency based on the distance between the wireless power reception device and the wireless power transmission device.

SUMMARY

In accordance with an aspect of the disclosure, an electronic device may include a power transmitter; a first communication interface configured to support an Ultra-Wideband (UWB) communication scheme; a second communication interface configured to support a Bluetooth communication scheme; and a processor configured to: control the first communication interface to transmit a first signal and receive a second signal corresponding to the first signal via the first communication interface, identify, based on a difference between a transmission time of the first signal and a reception time of the second signal, first location information of a first external device, control the power transmitter to transmit a first driving power having a first magnitude, based on a first distance between the first external device and the electronic device being within a first range, the first distance being identified based on the first location information, establish a Bluetooth communication connection with the first external device, based on receiving, via the second communication interface, a first packet transmitted from the first external device using the first driving power, after transmitting the first driving power, and control the power transmitter to transmit a first charging power having a second magnitude, after establishing the Bluetooth communication connection.

In accordance with an aspect of the disclosure, a method of operating an electronic device, the method including: transmitting a first signal via a first communication interface that supports a UWB communication scheme; receiving a second signal corresponding to the first signal via the first communication interface; identifying, based on a difference between a transmission time of the first signal and a reception time of the second signal, first location information of a first external device; transmitting a first driving power having a first magnitude via a power transmitter, based on a first distance between the first external device and the electronic device which is within a first range, the first distance being identified based on the first location information; establishing a Bluetooth communication connection with the first external device based on reception of a first packet transmitted from the first external device using the first driving power, via a second communication interface that supports a Bluetooth communication scheme, after transmitting the first driving power; and transmitting a first charging power having a second magnitude via the power transmitter, after establishing the Bluetooth communication connection.

According to various embodiments, by providing a wireless power transmission device that transmits charging power to a wireless power reception device and an operation method thereof, the location information of the wireless power reception device in a space may be identified and efficiency of wireless power transmission may be increased.

DETAILED DESCRIPTION

Figure 1:
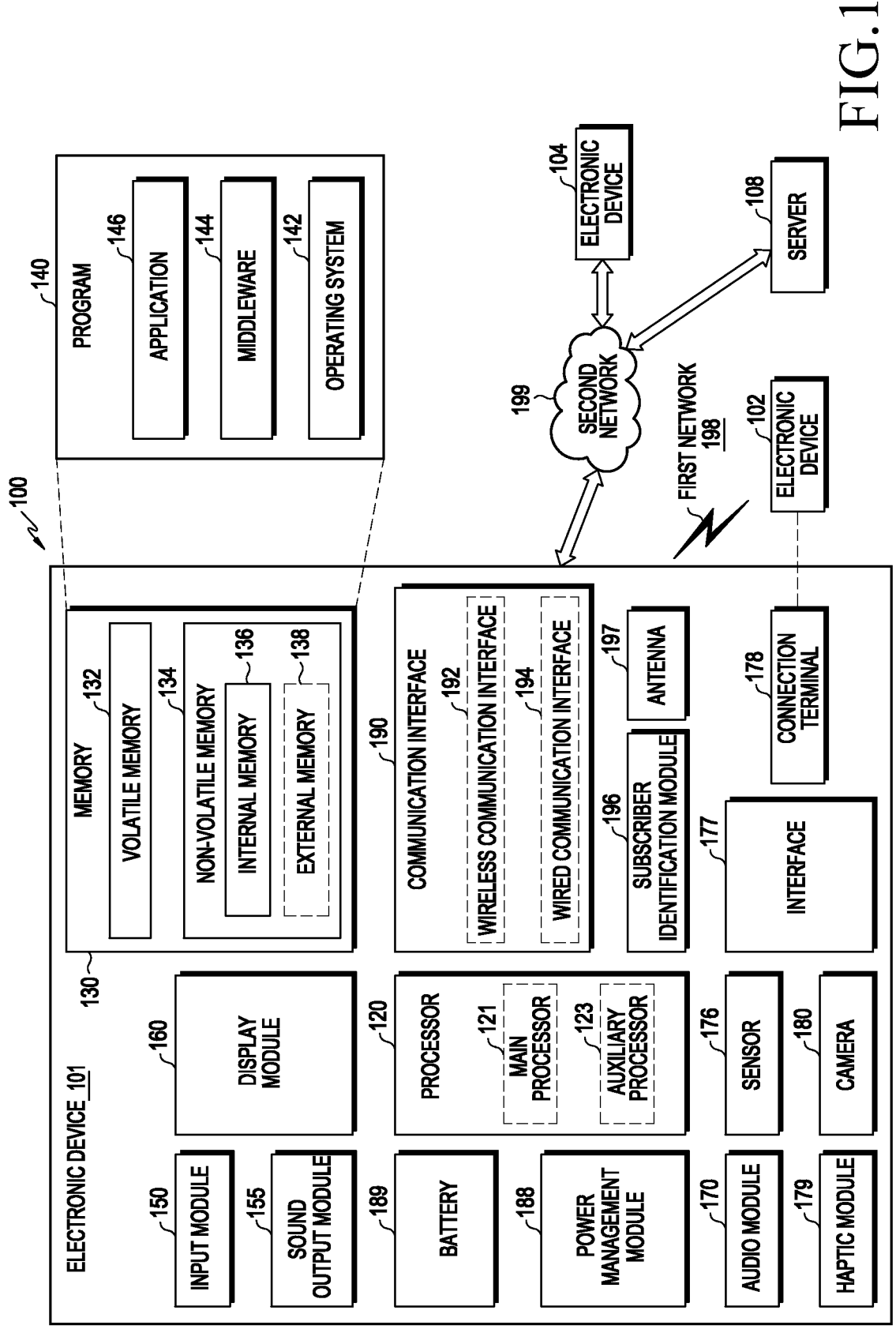
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication interface 190, a subscriber identification module (SIM) 196, or an antenna module 197. In some example embodiments, at least one of the components (e.g., the connecting terminal 178) may be omitted from the electronic device 101, or one or more other components may be added in the electronic device 101. In some example embodiments, some of the components (e.g., the sensor 176, the camera 180, or the antenna module 197) may be implemented as a single component (e.g., the display 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor 176 or the communication interface 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor 176, or the communication interface 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication interface 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via a sound output module 155 or an external electronic device (e.g., an electronic device 102 (e.g., a speaker or a headphone)) directly or wirelessly coupled with the electronic device 101.

The sensor 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication interface 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication interface 190 may include one or more communication processors that are operable independently from the processor 120 (e.g., the application processor (AP)) and supports a direct (e.g., wired) communication or a wireless communication. According to an embodiment, the communication interface 190 may include a wireless communication interface 192 (e.g., a cellular communication interface, a short-range wireless communication interface, or a global navigation satellite system (GNSS) communication interface) or a wired communication interface 194 (e.g., a local area network (LAN) communication interface or a power line communication (PLC) module). A corresponding one of these communication interfaces may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication interfaces may be implemented as a single component (e.g., a single chip), or may be implemented as multi components (e.g., multi chips) separate from each other. The wireless communication interface 192 may identify or authenticate the electronic device 101 in a communication network, such as the first network 198 or the second network 199, using subscriber information (e.g., international mobile subscriber identity (IMSI)) stored in the subscriber identification module 196.

The wireless communication interface 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication interface 192 may support a high-frequency band (e.g., the mmWave band) to achieve, e.g., a high data transmission rate. The wireless communication interface 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication interface 192 may support various requirements specified in the electronic device 101, an external electronic device (e.g., the electronic device 104), or a network system (e.g., the second network 199). According to an embodiment, the wireless communication interface 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna 197 may transmit or receive a signal or power to or from the outside (e.g., the external electronic device) of the electronic device 101. According to an embodiment, the antenna 197 may include an antenna including a radiating element composed of a conductive material or a conductive pattern formed in or on a substrate (e.g., a printed circuit board (PCB)). According to an embodiment, the antenna 197 may include a plurality of antennas (e.g., array antennas). In such a case, at least one antenna appropriate for a communication scheme used in the communication network, such as the first network 198 or the second network 199, may be selected, for example, by the communication interface 190 from the plurality of antennas.

The signal or the power may then be transmitted or received between the communication interface 190 and the external electronic device via the selected at least one antenna. According to an embodiment, another component (e.g., a radio frequency integrated circuit (RFIC)) other than the radiating element may be additionally formed as part of the antenna 197.

According to various embodiments, the antenna module 197 may form a mmWave antenna. According to an embodiment, the mmWave antenna may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
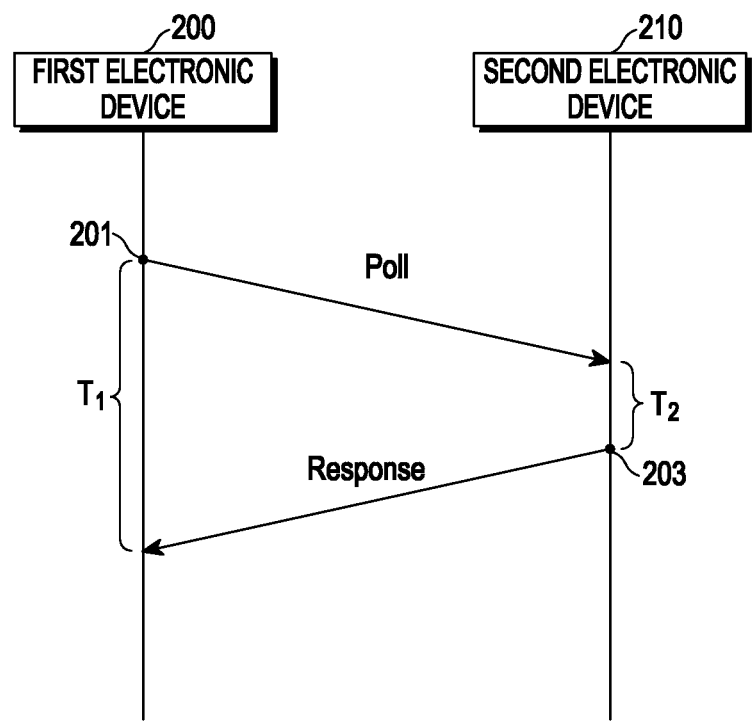
FIG. 2A is a flowchart illustrating a distance measurement process based on UWB communication according to various embodiments.
Figure 2B:
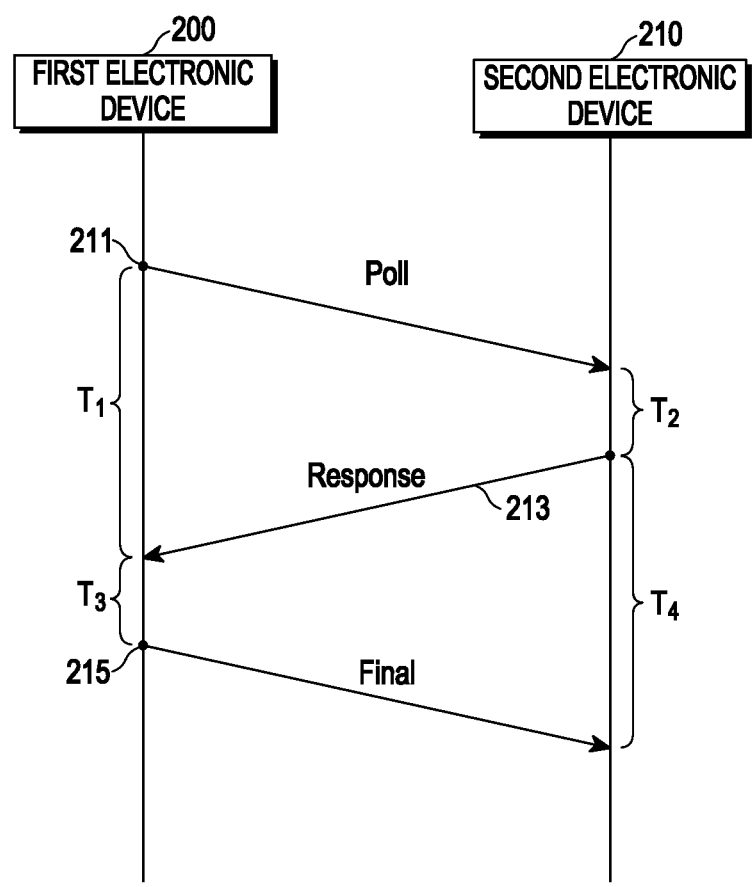
FIG. 2B is a flowchart illustrating a distance measurement process based on UWB communication according to various embodiments.

FIGS. 2A and 2B are flowcharts illustrating a distance measurement process based on UWB communication according to various embodiments.

A first electronic device 200 and a second electronic device 210 illustrated in FIGS. 2A and 2B are electronic devices that support UWB communication. However, the type of electronic devices is not limited. For example, the first electronic device 200 and/or second electronic device 210 may be the same type of electronic device as the electronic device 101 of FIG. 1, and the description of the electronic device 101 of FIG. 1 may be applicable to the first electronic device 200 and/or the second electronic device 210 when necessary. Hereinafter, regarding the description associated with operation of the first electronic device 200 and the second electronic device 210 that use UWB, those skilled in the art may understand that an operation which has been described as an operation of the second electronic device 210 may be performed by the first electronic device 200 and an operation which has been described as an operation of the first electronic device 200 may be performed by the second electronic device 210.

Referring to FIG. 2A, the first electronic device 200 according to various embodiments may identify the distance to the second electronic device 210 based on a single-sided two-way ranging (SS-TWR) scheme. For instance, the processor (e.g., the processor 120 of FIG. 1) of the first electronic device 200 and/or a communication interface (e.g., the communication interface 190 of FIG. 1) of the first electronic device 200) may identify the distance to the second electronic device 210 based on a single-sided two-way ranging (SS-TWR) scheme. The first electronic device 200 may transmit a poll message (e.g., a ranging poll) in operation 201. For example, the communication interface (e.g., the communication interface 190 of FIG. 1) of the first electronic device 200 may include a UWB communication interface, and the UWB communication interface may transmit a poll message. The second electronic device 210 (e.g., a processor (e.g., the processor 120 of FIG. 1) of the second electronic device 210 and/or a communication interface (e.g., the communication interface 190 of FIG. 1) of the second electronic device 210) may receive a poll message, and may transmit a response message (e.g., a ranging response) in response thereto in operation 203. For example, the communication interface (e.g., the communication interface 190 of FIG. 1) of the second electronic device 210 may include a UWB communication interface, and the UWB communication interface may transmit a response message. For reception of a poll message and transmission of a response message in response to the poll message, the second electronic device 210 may spend a second time (T2), and the second time is referred to as, for example, a process time. The second electronic device 210 may include the process time, for example, information associated with the second time (T2) in the response message, and may transmit the response message to the first electronic device 200.

The second electronic device 210 according to various embodiments may identify the distance between the first electronic device 200 and the second electronic device 210, based on the point in time at which a poll message is transmitted, the point in time at which a response message is received, and a process time (e.g., the second time (T2)) included in the response message. For example, if the difference between the point in time at which the poll message is transmitted and the point in time at which the response message is received is a first time (T1), the first electronic device 200 may identify (T1−T2)*c/2 (here, c is the speed of light) as the distance between the first electronic device 200 and the second electronic device 210.

According to various embodiments, unlike FIG. 2A, the second electronic device 210 may be an electronic device that does not support UWB communication, or the second electronic device 210 may be an electronic device that supports UWB communication but may be in the state of being incapable of performing UWB communication. In this instance, the first electronic device 200 (e.g., a processor (e.g., the processor 120 of FIG. 1) of the first electronic device 200 and/or a communication (e.g., the communication interface 190 of FIG. 1) of the first electronic device 200) may identify the distance to the second electronic device 210 based on a time of flight (ToF) scheme. For example, the first electronic device 200 may transmit a first signal to the second electronic device 210 using a communication interface (e.g., the communication interface 190 of FIG. 1), and may receive a second signal which corresponds to the first signal that is transmitted and is reflected from the second electronic device 210. The first electronic device 200 may identify the distance to the second electronic device 210 based on the difference between the point in time at which the first signal is transmitted and the point in time at which the second signal is received.

Referring to FIG. 2B, the first electronic device 200 according to various example embodiments may identify the distance to the second electronic device 210 based on a double-sided two-way ranging (DS-TWR) scheme. For instance, the processor (e.g., the processor 120 of FIG. 1) of the first electronic device 200 and/or a communication interface (e.g., the communication interface 190 of FIG. 1) of the first electronic device 200 may identify the distance to the second electronic device 210 based on a double-sided two-way ranging (DS-TWR) scheme. The first electronic device 200 may transmit a poll message in operation 211. For example, the communication interface (e.g., the communication interface 190 of FIG. 1) of the first electronic device 200 may include a UWB communication interface, and the UWB communication interface may transmit a poll message. The second electronic device 210 (e.g., a processor (e.g., the processor 120 of FIG. 1) of the second electronic device 210 and/or a communication interface (e.g., the communication interface 190 of FIG. 1) of the second electronic device 210) may receive a poll message, and may transmit a response message in response thereto in operation 213. For example, the communication interface (e.g., the communication interface 190 of FIG. 1) of the second electronic device 210 may include a UWB communication interface, and the UWB communication interface may transmit a response message. For reception of a poll message and transmission of a response message in response to the poll message, the second electronic device 210 may spend a process time of a second time (T2). The second electronic device 210 may include the process time, for example, information associated with the second time (T2) in the response message, and may transmit the response message to the first electronic device 200.

According to various example embodiments, the first electronic device 200 may transmit a final message (e.g., ranging final) based on reception of the response message in operation 215. For example, to receive the response message and to transmit the final message in response to the response message, the first electronic device 200 may spend a process time of a third time (T3). The first electronic device 200 may include the process time, for example, information associated with the third time (T3) in the final message, and may transmit the final message to the second electronic device 210.

The first electronic device 200 according to various example embodiments may identify the distance between the first electronic device 200 and the second electronic device 210, based on the point in time at which a poll message is transmitted, the point in time at which a response message is received, and a process time (e.g., the second time (T2)) included in the response message. The second electronic device 210 according to various example embodiments may identify the distance between the first electronic device 200 and the second electronic device 210, based on the point in time at which a response message is transmitted, the point in time at which a final message is received, and a process time (e.g., the third time (T3)) included in the final response. For example, if the difference between the point in time at which the response message is transmitted and the point in time at which the final message is received is a fourth time (T4), the second electronic device 210 may identify (T4−T3)*c/2 (here, c is the speed of light) as the distance between the first electronic device 200 and the second electronic device 210.

Figure 2C:
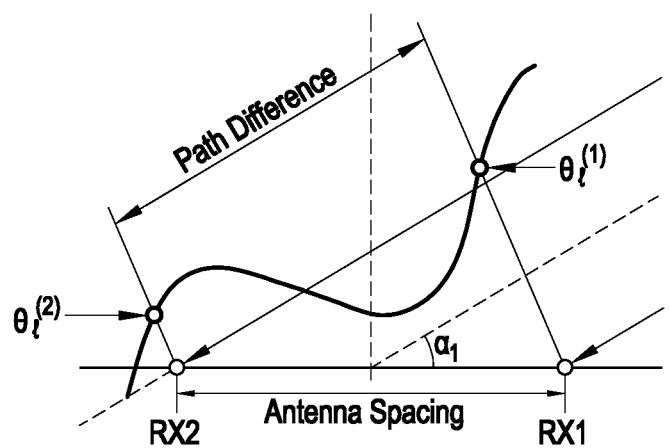
FIG. 2C is a diagram illustrating a direction measurement process based on reception of a UWB signal according to various embodiments.

FIG. 2C is a diagram illustrating a process for measuring a direction based on reception of a UWB signal according to various embodiments.

Hereinafter, although a direction measurement process based on reception of a UWB signal from the perspective of the first electronic device 200 will be described with reference to FIG. 2C, those skilled in the art will understand that the description is also applicable to a direction measurement process based on reception of a UWB signal from the perspective of the second electronic device 210.

Referring to FIG. 2C, the first electronic device 200 according to various embodiments may identify the direction of the second electronic device 210 which is based on the first electronic device 200, according to an angle of arrival (AOA) scheme. For instance, the processor (e.g., the processor 120 of FIG. 1) of the first electronic device 200 and/or a communication interface (e.g., the communication interface 190 of FIG. 1) of the first electronic device 200 may identify the direction of the second electronic device 210 which is based on the first electronic device 200, according to an angle of arrival (AOA) scheme. For example, the communication interface (e.g., the communication interface 190 of FIG. 1) (e.g., a UWB communication interface) of the first electronic device 200 may support two reception antennas (RX1, RX2). The two reception antennas (RX1, RX2) may be provided to have an antenna spacing therebetween. It is assumed that the second electronic device 210 is located in a direction corresponding to an angle of al based on the first electronic device 200. In this instance, due to the antenna spacing, there may be the difference in the points of time of receiving signals and the difference in phases of signals between the two reception antennas (RX1, RX2). For example, the phase of a signal received via a first reception antenna (RX1) may be $\theta_t^{(1)}$ and the phase of a signal received via a second reception antenna (RX2) may be $\theta_t^{(2)}$. The first electronic device 200 may identify an angle (al) at which the second electronic device 210 is located, based on the difference in phases measured at the both reception antennas (RX1, RX2) (or the difference in points in time of reception measured at the both reception antennas) and the antenna spacing.

According to various embodiments, based on a result measured at the two reception antennas (RX1, RX2), the first electronic device 200 may identify a first angle which corresponds to the direction in which the second electronic device 210 is located based on the first electronic device 200. According to various embodiments, the first electronic device 200 may include three or more reception antennas. The first electronic device 200 may identify, based on a result measured at a first combination of two reception antennas, a first angle which is the direction in which the second electronic device 210 is located based on the first electronic device 200, and may identify, based on a result measured at a second combination of two reception antennas, a second angle which is the direction in which the second electronic device 210 is located based on the first electronic device 200.

As described above, the first electronic device 200 may identify the distance to the second electronic device 210 and/or the direction of the second electronic device 210. In addition, as described above, the second electronic device 210 may identify the distance to the first electronic device 200 and/or the direction of the first electronic device 200, and redundant descriptions will be omitted.

Figure 3:
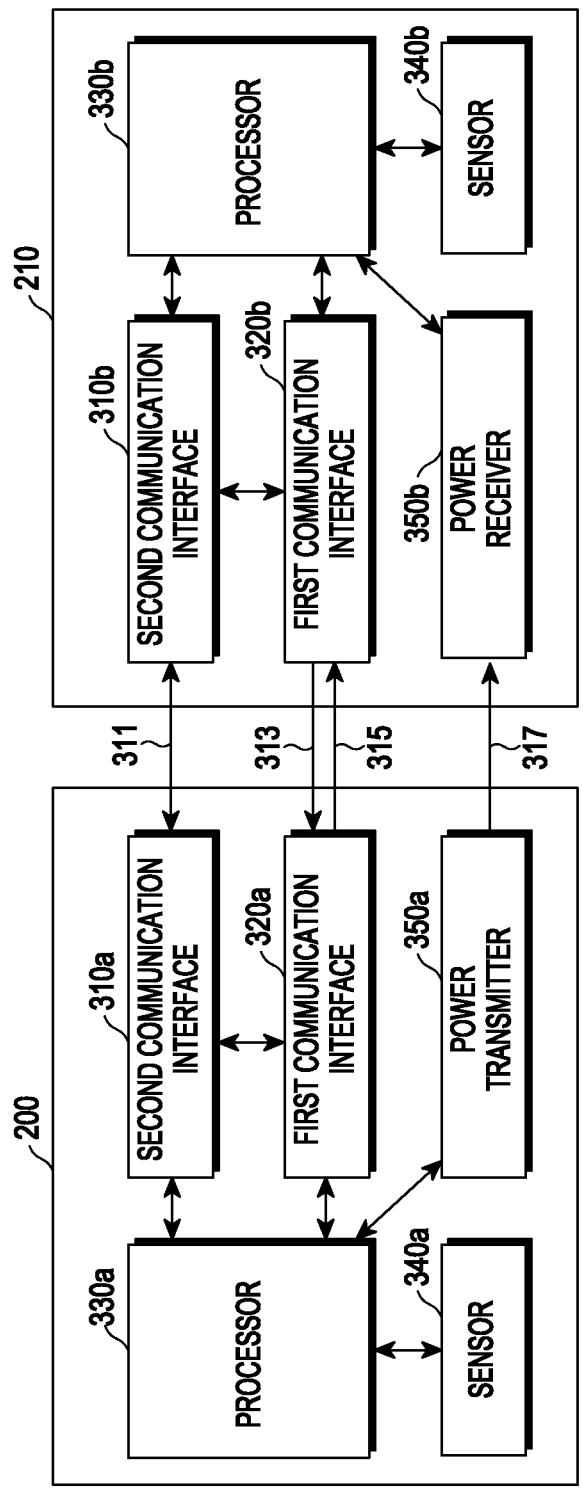
FIG. 3 is a block diagram of a first electronic device and a second electronic device according to various embodiments.
Figure 4:
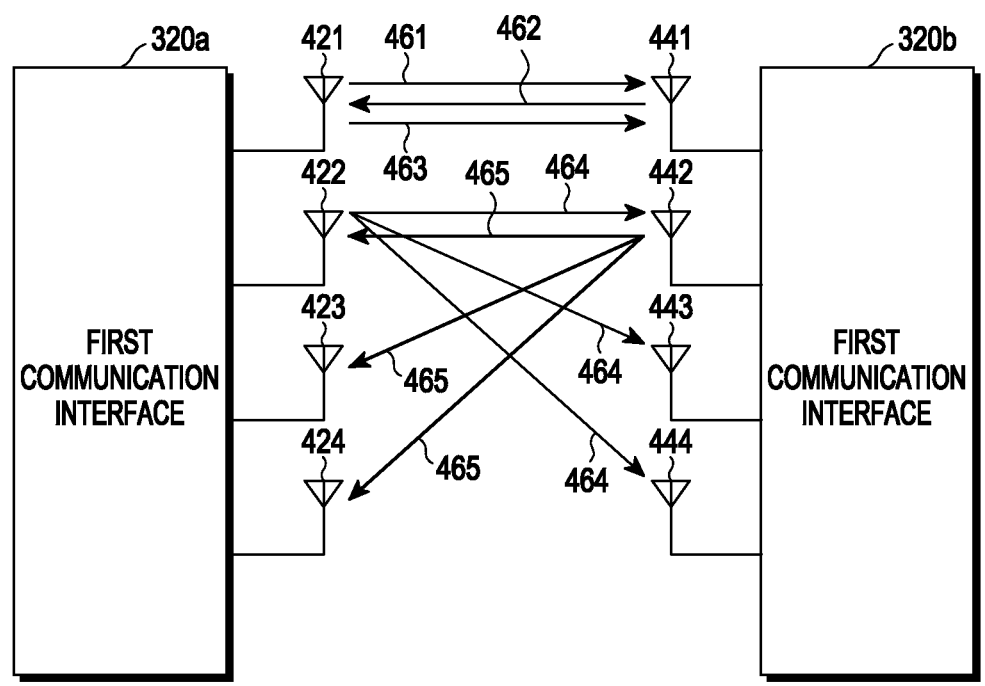
FIG. 4 is a diagram illustrating transmission or reception of a communication signal for each antenna of a first communication module according to various embodiments.

FIG. 3 is a block diagram of a first electronic device and a second electronic device according to various embodiments. The embodiments of FIG. 3 will be described with reference to FIG. 4. FIG. 4 is a diagram illustrating transmission or reception of a communication signal for each antenna of a first communication interface according to various embodiments.

Referring to FIG. 3, the first electronic device 200 according to various embodiments may include at least one of a processor 330a, a sensor 340a, a first communication interface 320a, a second communication interface 310a, and a power transmitter 350a. The first electronic device 200 may be understood as the wireless power transmission device 200. The second electronic device 210 may include at least one of the first communication interface 320b, the second communication interface 310b, the processor 330b, the sensor 340b, and the power receiver 350b. The second electronic device 210 may be understood as the wireless power reception device 210, and the first electronic device 200 and/or the second electronic device 210 may be implemented like the electronic device 101 of FIG. 1. The first communication interface 320a of the first electronic device 200 and the first communication interface 320b of the second electronic device 210 may support a first communication scheme. The first communication scheme may be, for example, a communication scheme for identifying the location of the second electronic device 210 (e.g., the distance from the first electronic device 200 to the second electronic device 210 and/or the direction of the second electronic device 210 based on the first electronic device 200) and/or the location of the first electronic device 200 (e.g., the distance from the second electronic device 210 to the first electronic device 200 and/or the direction of the first electronic device 200 based on the second electronic device 210), and may be UWB communication, but the communication scheme thereof is not limited. The second communication interface 310a of the first electronic device 200 and the second communication interface 310b of the second electronic device 210 may support a second communication scheme. The second communication scheme may be, for example, a Bluetooth (or Bluetooth low energy (BLE)) communication scheme, but the communication scheme thereof is not limited if the communication scheme is different from the first communication scheme. For example, the second communication scheme may be Zigbee, WiFi, and/or a near field communication (NFC) communication scheme, and the type of communication scheme is not limited.

According to various embodiments, the second communication interface 310a may establish a communication connection 311 to the second communication interface 310b, based on the second communication scheme. For example, if the second communication scheme is BLE (Bluetooth Low Energy) communication, the second communication interface 310a and the second communication interface 310b may establish a BLE connection. The BLE connection may be established, for example, based on signal transmission or reception between the second communication interface 310a and the second communication interface 310b, but it is not limited thereto.

According to various embodiments, the sensor 340a may sense at least one data for identifying the orientation of the first electronic device 200. The processor 330a may identify the orientation of the first electronic device 200 based on at least one data from the sensor 340a. The sensor 340b may sense at least one data for identifying the orientation of the second electronic device 210. The processor 330b may identify the orientation of the second electronic device 210 based on at least one data from the sensor 340b. The sensor 340a and/or sensor 340b may include, for example, an acceleration sensor, a gyro sensor, and/or a geomagnetic sensor, and the type of the sensor is not limited. The orientation of the first electronic device 200 and/or the orientation of the second electronic device 210 may be expressed, for example, by at least one angle, but an expression format is not limited.

According to various embodiments, the first electronic device 200 may receive a communication signal including information associated with the orientation of the second electronic device 210 via the second communication interface 310a. The processor 330b of the second electronic device 210 may identify the orientation of the second electronic device 210, and may transmit a communication signal including information associated with the orientation via the second communication interface 310b. The processor 330a of the first electronic device 200 may identify the difference between the orientation of the second electronic device 210 and the orientation of the first electronic device 200, identified based on the received communication signal. The second electronic device 210 may receive a communication signal including information associated with the orientation of the first electronic device 200 via the second communication interface 310b. The processor 330a of the first electronic device 200 may identify the orientation of the first electronic device 200, and may transmit a communication signal including information associated with the orientation via the second communication interface 310a. The processor 330b of the second electronic device 210 may identify the difference between the orientation of the first electronic device 200 and the orientation of the second electronic device 210, identified based on the received communication signal.

Referring to FIG. 3, according to various embodiments, the first communication interface 320a and the first communication interface 320b may transmit or receive communication signals 313 and 315 (e.g., UWB signals) based on a first communication scheme. The processor 330a and/or the first communication interface 320a may identify the location of the second electronic device 210 (e.g., the distance to the second electronic device 210 and/or the direction of the second electronic device 210) based on a result of measurement of the communication signal 315 from the outside. The processor 330b and/or the first communication interface 320b may identify the location of the first electronic device 200 (e.g., the distance to the first electronic device 200 and/or the direction of the first electronic device 200) based on a result of measurement of the communication signal 313 from the outside.

The power transmitter 350a according to various embodiments may wirelessly transmit power 317 according to at least one of an inductive scheme, a resonant scheme, or an electromagnetic scheme. The power transmitter 350a may include a power adapter, a power production circuit, and a coil. The power adapter may receive power from a power source and may provide the same to the power production circuit. The power adapter may be, for example, a power interface, and may not be included in a wireless power transmission device depending on the implementation. The power production circuit may convert received power into, for example, an alternating waveform, and/or amplify the received power, and may transmit the same to a coil. If power is provided to the coil, an inductive magnetic field of which the magnitude varies over time may be produced from the coil, and thus, the power 317 may be wirelessly transmitted. The processor 330a may determine whether to transmit the power 317, may control the magnitude of the power 317, or may control at least one function (e.g., initiate or suspend charging) of the first electronic device 200. The processor 330a or the processor 330b may be embodied as one of the various circuits capable of performing an operation, for example, a general-purpose processor such as a CPU, a mini computer, a microprocessor, a micro controlling unit (MCU), a field programmable gate array (FPGA), and the like, and the type of the processor is not limited.

The power receiver 350b according to various embodiments may wirelessly receive, from the power transmitter 350a, power according to at least one of an inductive scheme, a resonant scheme, or an electromagnetic scheme. The power receiver 350b may perform power processing, such as, rectifying received power of an alternating waveform into power of a direct waveform, converting a voltage, or regulating power. A charger of the second electronic device 210 may charge the battery of the second electronic device 210 using the received regulated power (e.g., DC power). The charger may adjust at least one of the voltage or current of the received power and may transfer the same to a battery. The battery may store power and may transfer the same to another piece of hardware. If a power management integrated circuit (PMIC) receives power from the power receiver 350b and may transfer the same to another piece of hardware, or may receive power from a battery and may transfer the same to another piece of hardware.

According to various embodiments, as illustrated in FIG. 4, the first communication interface 320a of the first electronic device 200 may include a distance measurement-dedicated antenna 421 and patch antennas 422, 423, and 424. The first communication interface 320b of the second electronic device 210 may include a distance measurement-dedicated antenna 441 and patch antennas 442, 443, and 444. Although the distance measurement-dedicated antenna 421 and 441 may be embodied as, for example, a metal antenna or a laser direct structuring (LDS) antenna, the embodied form thereof is not limited. The distance measurement-dedicated antenna 421 and 441 may be embodied to be used for 3GPP-based radio access technology (RAT) (e.g., E-UTRA or NR), in addition to a first communication scheme (e.g., UWB communication). In this instance, the distance measurement-dedicated antenna 421 and 441 may be used as a shared antenna for 3GPP-based RAT and UWB communication. Patch antennas 422, 423, 424, 442, 443, and 444 may be embodied as, for example, patch antennas, but the form of embodiment is not limited. For example, the parts described as patch antennas 422, 423, 424, 442, 443, and 444 may be embodied dipole antennas, slot antennas, and/or slit antennas, and the type of antenna is not limited. The first communication interface 320a may include an RF path for transmitting an RF signal and an RF path for receiving an RF signal in the distance measurement-dedicated antenna 421, and thus, the distance measurement-dedicated antenna 421 may be used for both transmission and reception of communication signals. The first communication interface 320a may include an RF path for transmitting an RF signal and an RF path for receiving an RF signal in the patch antenna 422, and thus, the patch antenna 422 may be used for both transmission and reception of communication signals. The first communication interface 320a may include an RF path for receiving an RF signal from the patch antennas 423 and 424, and thus, the patch antennas 423 and 424 may be used for reception of communication signals. The first communication interface 320b may include an RF path for transmitting an RF signal and an RF path for receiving an RF signal in the distance measurement-dedicated antenna 441, and thus, the distance measurement-dedicated antenna 441 may be used for both transmission and reception of communication signals. The first communication interface 320b may include an RF path for transmitting an RF signal and an RF path for receiving an RF signal in the patch antenna 442, and thus, the patch antenna 442 may be used for both transmission and reception of communication signals. The first communication interface 320b may include an RF path for receiving an RF signal from the patch antennas 443 and 444, and thus, the patch antennas 443 and 444 may be used for reception of communication signals.

According to various embodiments, the first communication interface 320a may transmit a communication signal 461 (e.g., the poll message of FIG. 2A or 2B) using the distance measurement-dedicated antenna 421. The first communication interface 320b may receive the communication signal 461 using the distance measurement-dedicated antenna 441. The first communication interface 320b may transmit a communication signal 462 (e.g., the response message of FIG. 2A or 2B) using the distance measurement-dedicated antenna 441. The first communication interface 320a may receive the communication signal 462 using the distance measurement-dedicated antenna 421. The first communication interface 320a may transmit a communication signal 463 (e.g., the final message of FIG. 2B) using the distance measurement-dedicated antenna 421. The first communication interface 320b may receive the communication signal 463 using the distance measurement-dedicated antenna 441. The first communication interface 320a may identify the distance between the first electronic device 200 and the second electronic device 210, based on the point in time at which the communication signal 461 is transmitted, the point in time at which the communication signal 462 is received, and the process time of the second electronic device 210 obtained from the communication signal 462. The first communication interface 320b may identify the distance between the first electronic device 200 and the second electronic device 210, based on the point in time at which the communication signal 462 is transmitted, the point in time at which the communication signal 463 is received, and the process time of the first electronic device 210 obtained from the communication signal 463. The first communication interface 320a may use the distance measurement-dedicated antenna 421 so as to identify the distance between the first electronic device 200 and the second electronic device 210.

According to various embodiments, the first communication interface 320a may transmit a communication signal 464 via the patch antenna 422. The communication signal 464 may be measured at the patch antennas 442, 443, and 444 of the first communication interface 320b. Based on the antenna spacing among the patch antennas 442, 443, and 444, the point in time of measuring the communication signal 464 and/or the measured phase of the communication signal 464 may be different. Based on the difference in the points in time of measurement and/or the difference in the measured phases corresponding to the patch antennas 442, 443, and 444, the first communication interface 320b may identify the direction of the first electronic device 200 which is based on the second electronic device 210. The first communication interface 320b may transmit a communication signal 465 using the patch antenna 442, and the point in time of measuring the communication signal 465 and/or the measured phase of the communication signal 465 may be different based on the antenna spacing among the patch antennas 422, 423, and 424. Based on the difference in the points in time of measurement and/or the measured phases corresponding to the patch antennas 422, 423, and 424, the first communication interface 320a may identify the direction of the second electronic device 210 which is based on the first electronic device 200. In the case in which, after the first communication interface 320a of the first electronic device 200 transmits the communication signal 464, the first communication interface 320b of the second electronic device 210 transmits the communication signal 465 in response thereto, the first communication interface 320a may identify the distance between the first electronic device 200 and the second electronic device 210 based on the point in time of transmitting the communication signal 464, the point in time at which the communication signal 465 is received, and the process time of the second electronic device 210 obtained from the communication signal 465. The first communication interface 320a may identify, using the patch antennas 422, 423, and 424, the distance between the first electronic device 200 and the second electronic device 210 and the direction of the second electronic device 210 at least at the same time. In the case in which, after the first communication interface 320b of the second electronic device 210 transmits the communication signal 465, the first communication interface 320a of the first electronic device 200 transmits the communication signal 464 in response thereto, the first communication interface 320b may identify the distance between the first electronic device 200 and the second electronic device 210 based on the point in time at which the communication signal 465 is transmitted, the point in time at which the communication signal 464 is received, and the process time of the first electronic device 200 obtained from the communication signal 464. The first communication interface 320b may identify, using the patch antennas 442, 443, and 444, the distance between the first electronic device 200 and the second electronic device 210 and the direction of the first electronic device 200 at least at the same time.

According to various embodiments of the disclosure, an operation in which the first electronic device 200 measures the location of the second electronic device 210 may be, for example, one of measuring the distance to the second electronic device 210 and the direction thereof using a plurality of antennas (e.g., the patch antennas 422, 423, and 424), or measuring the distance to the second electronic device 210 using a single antenna (e.g., the distance measurement-dedicated antenna 421). In the same manner, an operation in which the second electronic device 210 measures the location of the first electronic device 200 may be, for example, one of measuring the distance to the first electronic device 200 and the direction thereof using a plurality of antennas (e.g., the patch antennas 442, 443, and 444), or measuring the distance to the first electronic device 200 using a single antenna (e.g., the distance measurement-dedicated antenna 441).

Figure 5:
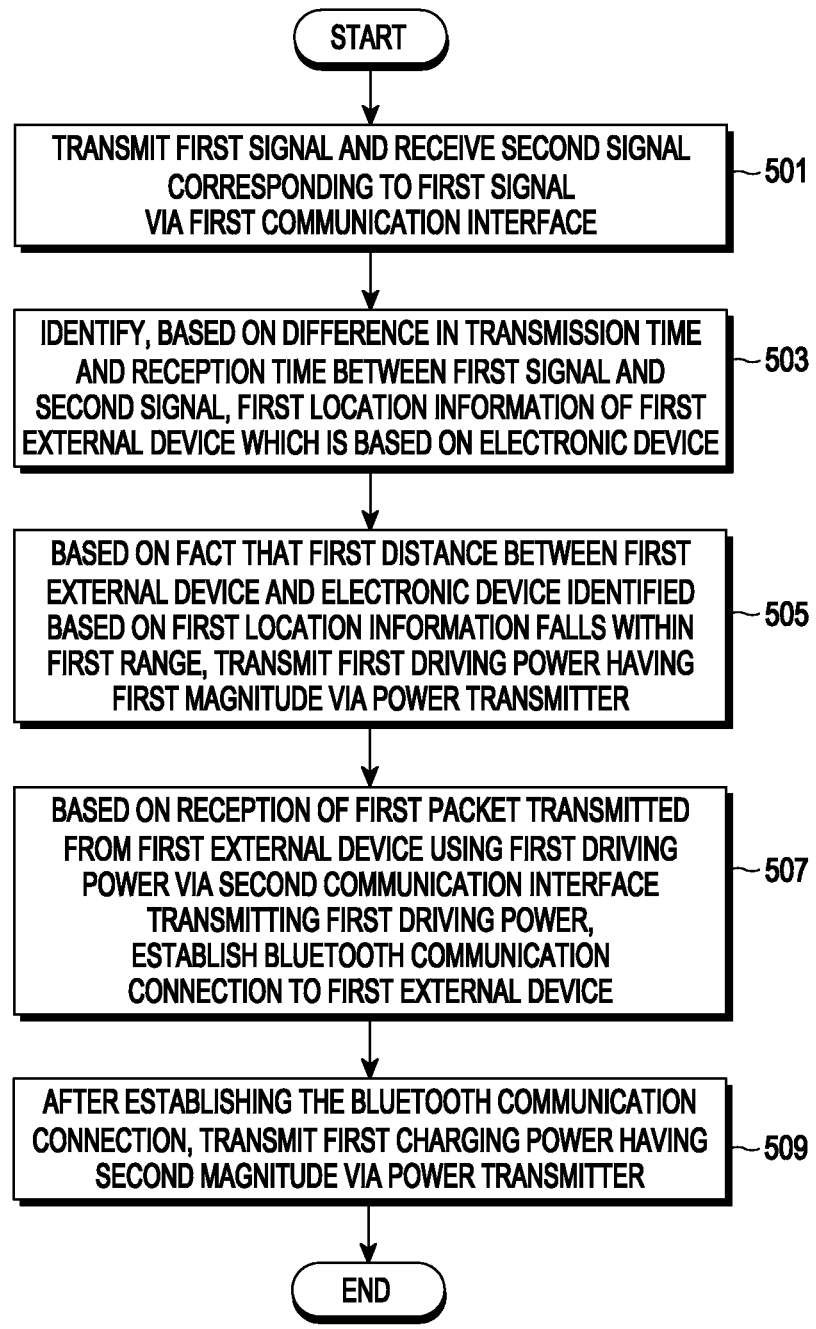
FIG. 5 is a flowchart illustrating an operation method of an electronic device according to various embodiments.

FIG. 5 is a flowchart illustrating an operation method of an electronic device according to various embodiments.

FIG. 5 will be described with reference to FIG. 3. In the description of FIG. 5, the electronic device 200 may be the first electronic device 200 of FIG. 3. In the description of FIG. 5, the external device 210 may be the second electronic device 210 of FIG. 3.

Referring to FIG. 5, in operation 501, according to various embodiments, the electronic device 200 (e.g., the processor 330a of the electronic device 200) may transmit a first signal and may receive a second signal corresponding to the first signal via the first communication interface 320a. For example, the electronic device 200 may transmit a first signal (e.g., a poll message) via the first communication interface 320a. The external device 210 (e.g., the processor 330b of the external device 210) may receive a first signal (e.g., a poll message) via the first communication interface 320b, and may transmit a second signal (e.g., a response message) in response thereto. The electronic device 200 may receive the second signal (e.g., a response message) via the first communication interface 320a. Alternatively, as another example, the electronic device 200 may transmit a first signal via the first communication interface 320a, and may receive a second signal which is a reflected signal of the first signal that returns after being reflected from the external device 210.

In operation 503, according to various embodiments, the electronic device 200 may identify location information of the external device 210 which is based on the electronic device 200 (e.g., information associated with the distance between the electronic device 200 and the external device 210 and/or information associated with the direction in which the external device 210 is located based on the electronic device 200), based on the difference between transmission time of the first signal and reception time of the second signal. For example, as illustrated in FIG. 2A, based on the difference between transmission time of the first signal and reception time of the second signal, and a process time spent until the external device 210 transmits the second signal after receiving the first signal, the electronic device 200 may identify the location information of the external device 210 which is based on the electronic device 200 (e.g., information associated with the difference between the electronic device 200 and the external device 210 and/or information associated with the direction in which the external device 210 is located based on the electronic device 200), according to the single-sided two-way ranging (SS-TWR) scheme. Alternatively, according to another example embodiment, if the electronic device 200 receives the second signal that is a reflected signal of the first signal returning after being reflected, the electronic device 200 may identify the location information of the external device 210 which is based on the electronic device 200 (e.g., information associated with the distance from the electronic device 200 to the external device 210) based on the point in time at which the first signal is transmitted and the point in time at which the second signal is received, according to the ToF scheme.

In operation 505, according to various embodiments, the electronic device 200 may control the power transmitter 350a so as to transmit driving power having a certain magnitude (e.g., a first magnitude) based on the distance (e.g., 40 cm) between the external device 210 and the electronic device 200 which is identified based on the location information of the external device 210 which is based on the electronic device 200 being within a certain range (e.g., 60 cm or less). According to an example embodiment, the certain magnitude may be a predetermined magnitude and the certain range may be a predetermined range. The predetermined range is an example, and the range is not limited. The driving power is power that is transmitted from the electronic device 200 to the external device 210, and is to be used for driving at least one element of the external device 210. As an example, driving power may be a long-beacon defined in air fuel alliance (AFA), and the purpose of a long-beacon is to secure for the external device 210 to receive enough power to perform bootup and provide a response. The magnitude of driving power may be determined according to, for example, AFA, but it is not limited thereto. For example, the electronic device 200 may transmit a first driving power having a first magnitude via the power transmitter 350a, and the external device 210 may receive the first driving power via the power receiver 350b. The external device 210 may drive the processor 330b and/or the second communication interface 310b (e.g., the BLE communication interface) using the first driving power, and accordingly, the external device 210 may transmit a packet (e.g., a Bluetooth advertising packet) via the second communication interface 310b. The electronic device 200 may determine the magnitude of the driving power to be transmitted to be a first magnitude, and an example embodiment in which the electronic device 200 determines the magnitude of driving power to be transmitted will be described later.

In operation 507, according to various embodiments, after transmitting driving power (e.g., a first driving power), the electronic device 200 may establish a Bluetooth communication connection to the external device 210 based on reception of a packet (e.g., a first packet) transmitted from the external device 210 using the driving power (i.e., the first driving power), via the second communication interface 310a. For example, the electronic device 200 may receive a Bluetooth advertising packet from the external device 210 after transmitting the first driving power, and then, may establish a Bluetooth communication connection according to a Bluetooth communication procedure. For example, in response to reception of a Bluetooth advertising packet, the electronic device 200 may transmit a connection request to the external device 210, and accordingly, a Bluetooth communication connection may be established. However, an embodiment method thereof is not limited.

In operation 509, according to various embodiments, the electronic device 200 may transmit charging power (e.g., charging power having a second magnitude) via the power transmitter 350a, after establishing the Bluetooth communication connection to the external device 210. The electronic device 200 may transmit charging power (e.g., charging power having a second magnitude) via the power transmitter 350a, after performing a procedure of charging based on the Bluetooth communication connection to the external device 210. The charging power may be power that is transmitted from the electronic device 200 to the external device 210, and is to be used for charging the battery of the external device 210. For example, the electronic device 200 may determine the magnitude of the charging power to be transmitted to be a second magnitude, and an example embodiment in which the electronic device 200 determines the magnitude of charging power to be transmitted will be described later. The 'procedure for charging' may be a procedure of transmitting or receiving, between the electronic device 200 and the external device 210, information needed for transmitting wireless charging power from the electronic device 200 to the external device 210. For example, according to AFA, after a Bluetooth communication connection is established between the electronic device 200 and the external device 210, the external device 210 may transmit a power receiving unit (PRU) static signal. The PRU static signal may be a signal indicating the state of the external device 210, and the external device 210 may request subscription to a wireless power network controlled by the electronic device 200. The electronic device 200 may transmit a power transmitting unit (PTU) static signal. The PTU static signal may be a signal indicating capability of the electronic device 200. If the electronic device 200 and the external device 210 transmit or receive a PRU static signal and a PTU static signal, the external device 210 may periodically transmit a PRU dynamic signal. The PRU dynamic signal may include at least one piece of parameter information measured by the external device 210. For example, the PRU dynamic signal may include voltage information of the latter part of a rectifier of the external device 210. In this instance, the state of the external device 210 may be referred to as a boot state. The electronic device 200 may enter a power transmission mode, and the electronic device 200 may transmit a PRU control signal which is a command signal to direct the external device 210 to perform charging. In a power transmission mode, the electronic device 200 may transmit charging power. Although at least part of the above-described signal transmission or reception may be referred to as a procedure of charging, this is not limited. In addition, those skilled in the art would understand that various other standards in addition to AFA may be applicable to various embodiments of the disclosure.

According to various embodiments, the electronic device 200 may control the power transmitter 350a so as to transmit detection power, in parallel with performing operation 501 and/or operation 503, or independently from operation 501 and/or operation 503. The detection power may be power that is transmitted from the electronic device 200 to the external device 210, and is to be used for detecting the external device 210. For example, the detection power may be power for detecting a change in the impedance of the electronic device 200 caused by the location of an object in the charging area of the electronic device 200. The detection power may be, for example, a short-beacon defined in AFA, but it is not limited. According to various embodiments, those skilled in the art would understand that the electronic device 200 may control the power transmitter 350a so as to transmit driving power having a predetermined magnitude if the external device 210 is detected by detection power.

Figure 6:
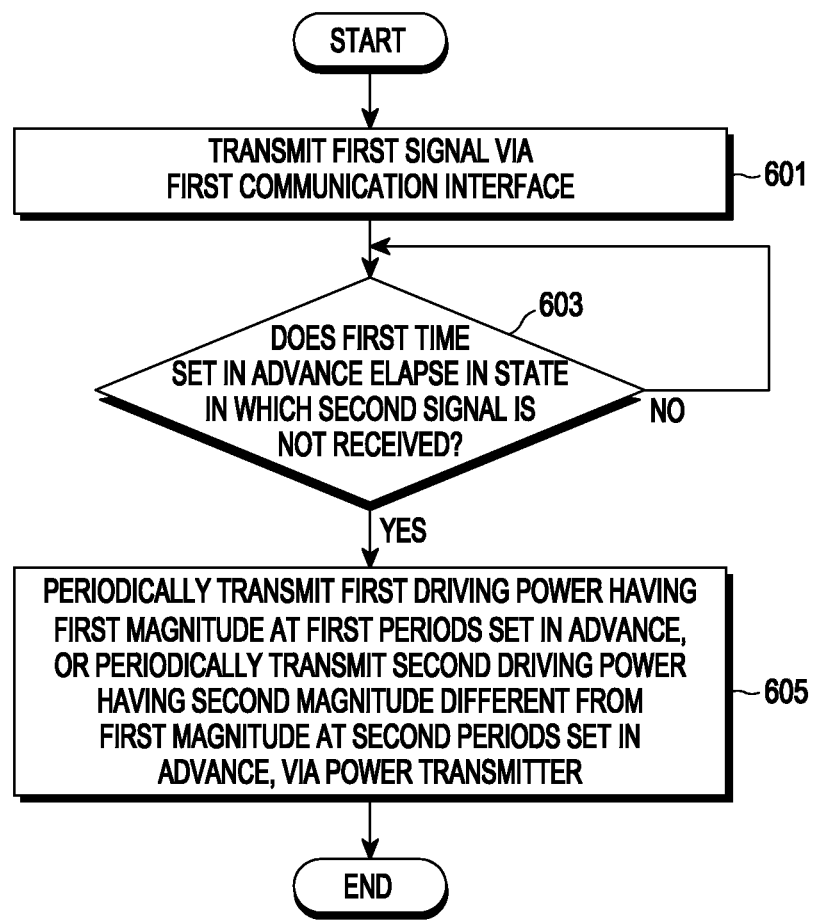
FIG. 6 is a flowchart illustrating an operation method of an electronic device according to various embodiments.

FIG. 6 is a flowchart illustrating an operation method of an electronic device according to various embodiments. FIG. 6 will be described with reference to FIG. 3. In the description of FIG. 6, the electronic device 200 may be the first electronic device 200 of FIG. 3. In the description of FIG. 6, the external device 210 may be the second electronic device 210 of FIG. 3.

Referring to FIG. 6, in operation 601, according to various embodiments, the electronic device 200 (e.g., the processor 330a of the electronic device 200) may transmit a first signal via the first communication interface 320a. For example, the electronic device 200 may transmit a first signal (e.g., a poll message) via the first communication interface 320a.

In operation 603, according to various embodiments, the electronic device 200 may determine whether a predetermined time (e.g., a first time) elapses in the state in which a second signal is not received. For example, after transmitting the first signal in operation 601, the electronic device 200 may proceed with operation 605 based on the preset first time elapsing in the state in which the second signal corresponding to the first signal is not received.

In operation 605, according to various embodiments, the electronic device 200 may periodically transmit driving power having a first magnitude via the power transmitter 350a at preset first periods, or may periodically transmit detection power having a second magnitude different from the first magnitude (e.g., power that is transmitted from the electronic device 200 and is for detecting a device (e.g., the external device 210) existing outside the electronic device 200) at preset second periods. For example, the detection power may be power for detecting a change in the impedance of the electronic device 200 caused by the location of an object in the charging area of the electronic device 200. The detection power may be, for example, a short-beacon defined in AFA, but it is not limited. For example, the electronic device 200 may periodically transmit first driving power having a first magnitude at preset first periods based on the preset first time elapsing in the state in which the second signal corresponding to the first signal is not received after the first signal is transmitted in operation 601. The external device 210 may receive the first driving power via the power receiver 350b, and may drive the processor 330b and/or the second communication interface 310b (e.g., the BLE communication interface) using the first driving power, and thus, the external device 210 may transmit a packet (e.g., a Bluetooth advertising packet) via the second module 310b. Subsequently, the electronic device 200 and the external device 210 may establish a Bluetooth communication connection, and may perform above-described operation 509. In addition, for example, the electronic device 200 may periodically transmit a first detection power having a second magnitude different from the first magnitude at preset second periods, based on the preset first time elapsing in the state in which the second signal corresponding to the first signal is not received after the first signal is transmitted in operation 601. If the external device 210 is disposed around the electronic device 200, an impedance shown from a point of the electronic device 200 may vary due to the first detection power. The electronic device 200 may detect a change in impedance while the first detection power is being provided. Accordingly, the electronic device 200 may detect an object (e.g., the external device 210). Subsequently, the electronic device 200 may transmit the first driving power and may perform above-described operation 507.

Figure 7:
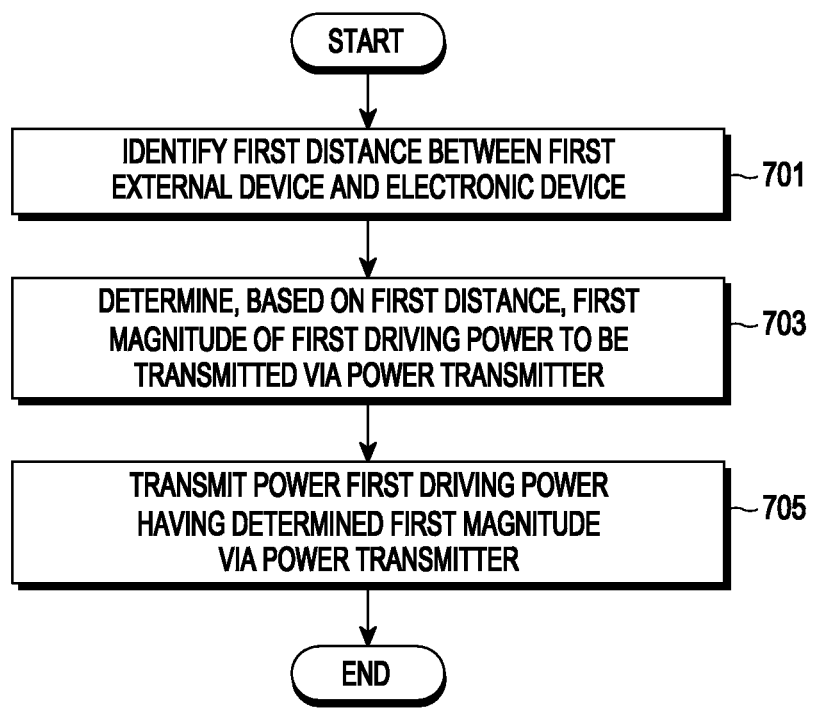
FIG. 7 is a flowchart illustrating an operation method of an electronic device according to various embodiments.

FIG. 7 is a flowchart illustrating an operation method of an electronic device according to various embodiments. FIG. 7 will be described with reference to FIG. 3. In the description of FIG. 7, the electronic device 200 may be the first electronic device 200 of FIG. 3. In the description of FIG. 7, the external device 210 may be the second electronic device 210 of FIG. 3.

Referring to FIG. 7, in operation 701, according to various embodiments, the electronic device 200 (e.g., the processor 330a of the electronic device 200) may identify the distance between the external device 210 and the electronic device 200. For example, based on the location information of the external device 210 which is based on the electronic device 200 and is identified in operation 503, the electronic device 200 may identify the distance (e.g., a distance) between the external device 210 and the electronic device 200.

In operation 703, according to various embodiments, based on the distance between the external device 210 and the electronic device 200, the electronic device 200 may determine the magnitude of driving power to be transmitted via the power transmitter 350a. For example, the electronic device 200 may determine the magnitude of driving power corresponding to the distance between the external device 210 and the electronic device 200. For example, based on the distance between the external device 210 and the electronic device 200 being within a first range (e.g., 20 cm or less), the electronic device 200 may determine the magnitude of driving power to be transmitted via the power transmitter 350a to be a first magnitude, and based on the distance between the external device 210 and the electronic device 200 being within a second range (e.g., exceed 20 cm and less than or equal to 40 cm), the electronic device 200 may determine the magnitude of driving power to be transmitted via the power transmitter 350a to be a second magnitude (e.g., the second magnitude greater than the first magnitude). The range and the magnitude are merely example, and they are not limited thereto. According to another example embodiment, the electronic device 200 may determine the magnitude of driving power to be transmitted via the power transmitter 350a based on an equation that takes the distance between the external device 210 and the electronic device 200 as a variable. According to another example embodiment, the electronic device 101 may determine the magnitude of driving power to be transmitted with reference to association information (e.g., a lookup table) between the distance and the magnitude of driving power, and a scheme of determining the magnitude of driving power based on a distance is not limited.

In operation 705, according to various embodiments, the electronic device 200 may transmit driving power having a magnitude (e.g., a first magnitude) determined in operation 703, via the power transmitter 350a.

Figure 8:
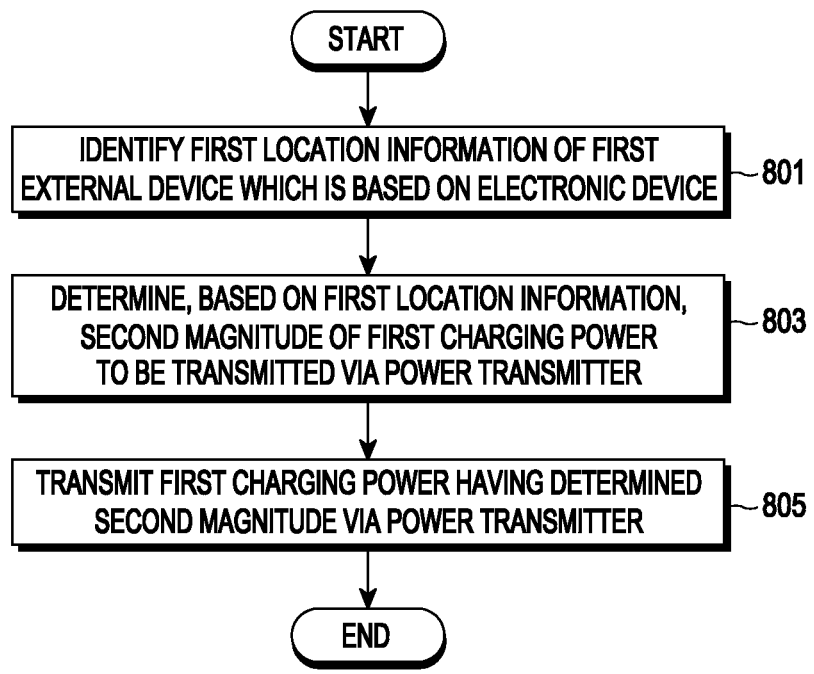
FIG. 8 is a flowchart illustrating an operation method of an electronic device according to various embodiments.

FIG. 8 is a flowchart illustrating an operation method of an electronic device according to various embodiments. FIG. 8 will be described with reference to FIG. 3. In the description of FIG. 8, the electronic device 200 may be the first electronic device 200 of FIG. 3. In the description of FIG. 8, the external device 210 may be the second electronic device 210 of FIG. 3.

Referring to FIG. 8, in operation 801, according to various embodiments, the electronic device 200 (e.g., the processor 330a of the electronic device 200) may identify the location information of the external device 210 which is expressed based on the electronic device 200 (e.g., the location information of the external device 210 based on the electronic device 200 identified in operation 503).

In operation 803, according to various embodiments, based on the location information of the external device 210 based on the electronic device 200, the electronic device 200 may determine the magnitude of charging power to be transmitted via the power transmitter 350a. For example, based on the distance between the external device 210 and the electronic device 200 being within a predetermined first range (e.g., 20 cm or less), the electronic device 200 may determine the magnitude of charging power to be transmitted via the power transmitter 350a to be a third magnitude, and based on the distance between the external device 210 and the electronic device 200 being within a predetermined second range (e.g., exceed 20 cm and less than or equal to 40 cm), the electronic device 200 may determine the magnitude of charging power to be transmitted via the power transmitter 350a to be a fourth magnitude (e.g., the fourth magnitude greater than the third magnitude). The range and the magnitude are merely example, and they are not limited thereto. As another example, based on an equation that takes the distance between the external device 210 and the electronic device 200 as a variable, the electronic device 200 may determine the magnitude of charging power to be transmitted via the power transmitter 350a. Alternatively, the electronic device 101 may determine the magnitude of charging power to be transmitted with reference to association information (e.g., a lookup table) between the distance and the magnitude of charging power, and a scheme of determining the magnitude of charging power based on a distance is not limited.

In operation 805, according to various embodiments, the electronic device 200 may transmit, via the power transmitter 350a, charging power having a magnitude (e.g., a first magnitude) determined in operation 803.

Figure 9:
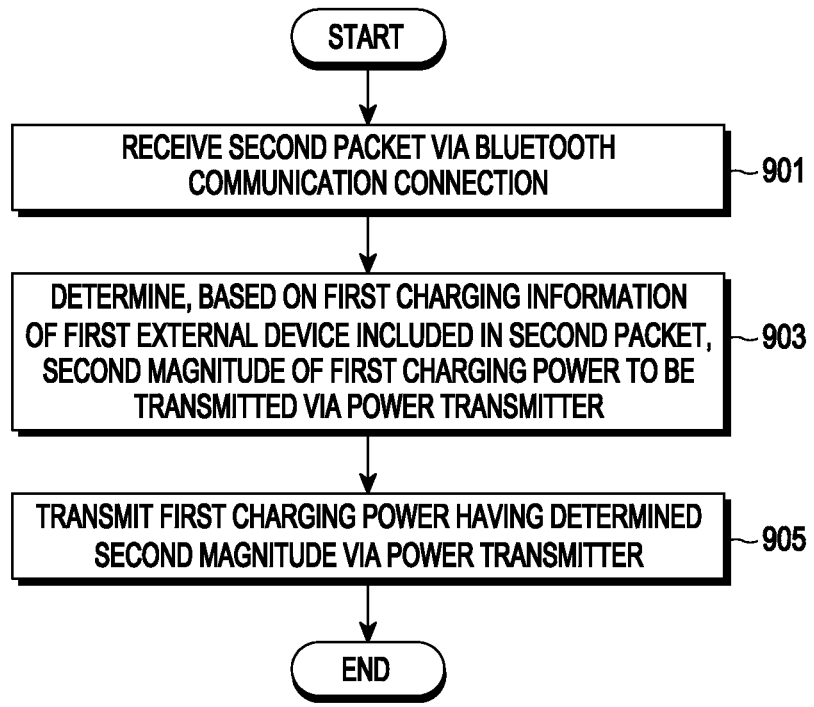
FIG. 9 is a flowchart illustrating an operation method of an electronic device according to various embodiments.

FIG. 9 is a flowchart illustrating an operation method of an electronic device according to various embodiments. FIG. 9 will be described with reference to FIG. 3. In the description of FIG. 9, the electronic device 200 may be the first electronic device 200 of FIG. 3. In the description of FIG. 9, the external device 210 may be the second electronic device 210 of FIG. 3.

Referring to FIG. 9, in operation 901, according to various embodiments, the electronic device 200 (e.g., the processor 330a of the electronic device 200) may establish a Bluetooth communication connection to the external device 210 based on the reception of a first packet (e.g., a Bluetooth advertising packet) from the external device 210, and may receive a second packet (e.g., a packet corresponding to a PRU static signal and/or a packet corresponding to a PRU dynamic signal) based on the Bluetooth communication connection to the external device 210. For example, the second packet (e.g., a packet corresponding to a PRU static signal and/or a packet corresponding to a PRU dynamic signal) transmitted from the external device 210 to the electronic device 200 based on the Bluetooth communication connection may include charging information of the external device 210. For example, the charging information of the external device 210 may include at least one piece of information among information indicating the state of the external device 210 (e.g., an On-Off state), voltage information at the latter part of a rectifier of the external device 210, current information at the latter part of the rectifier of the external device 210, voltage information at the latter part of a DC/DC converter, current information at the latter part of the DC/DC converter of the external device 210, temperature information, the minimum voltage value information (VRECT_MIN_DYN) at the latter part of the rectifier of the external device 210, optimal voltage value information (VRECT_SET_DYN) at the latter part of the rectifier of the external device 210, the maximum voltage value information (VRECT_HIGH_DYN) at the latter part of the rectifier of the external device 210, or alert information (PRU alert).

In operation 903, according to various embodiments, based on charging information of the external device 210 included in a second packet (e.g., a packet corresponding to a PRU static signal and/or a packet corresponding to a PRU dynamic signal) received based on a Bluetooth communication connection to the external device 210, the electronic device 200 may determine the magnitude of charging power to be transmitted via the power transmitter 350a. For example, based on the charging information of the external device 210, the electronic device 200 may determine the magnitude of charging power to be transmitted to the external device 210 with reference to at least one voltage set value (e.g., the minimum voltage value information (VRECT_MIN_DYN) at the latter part of the rectifier of the external device 210, optimal voltage value information (VRECT_SET_DYN) at the latter part of the rectifier of the external device 210, the maximum voltage value information (VRECT_HIGH_DYN) at the latter part of the rectifier of the external device 210 determined according to a charging situation of the external device 210. Alternatively, the electronic device 101 may determine the magnitude of charging power to be transmitted with reference to association information (e.g., a lookup table) between the charging information of the external device 210 and the magnitude of charging power, and a scheme of determining the magnitude of charging power based on the charging information of the external device 210 is not limited.

In operation 905, according to various embodiments, the electronic device 200 may transmit, via the power transmitter 350a, charging power having a magnitude (e.g., a first magnitude) determined in operation 903.

Figure 10:
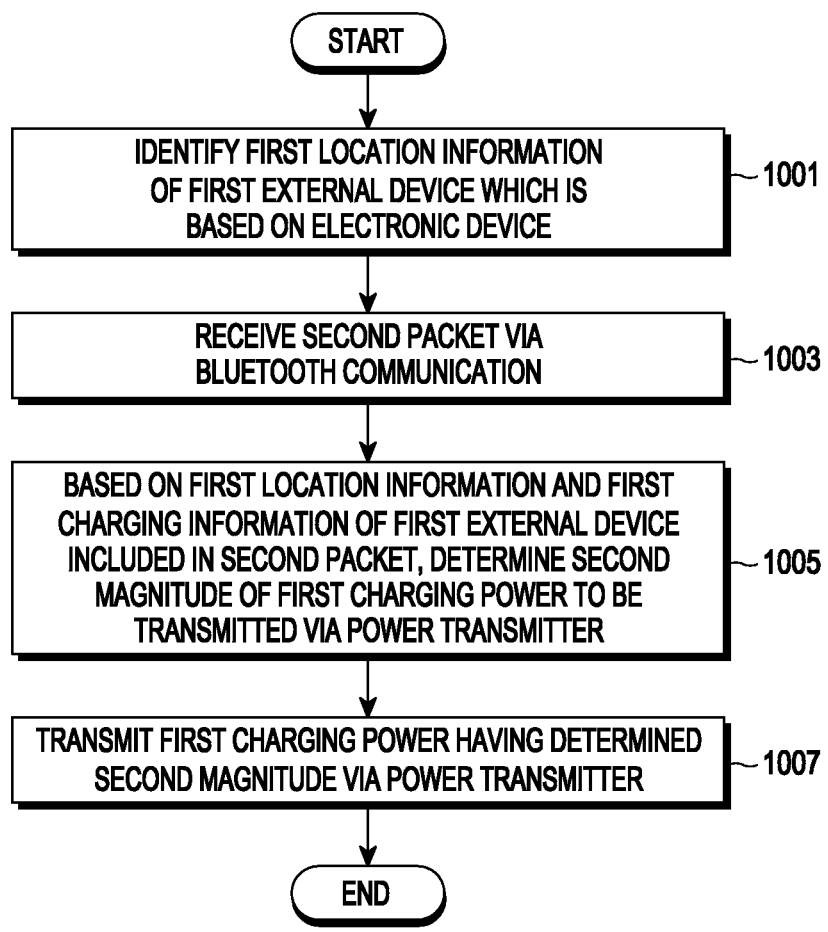
FIG. 10 is a flowchart illustrating an operation method of an electronic device according to various embodiments.

FIG. 10 is a flowchart illustrating an operation method of an electronic device according to various embodiments. FIG. 10 will be described with reference to FIG. 3. In the description of FIG. 10, the electronic device 200 may be the first electronic device 200 of FIG. 3. In the description of FIG. 10, the external device 210 may be the second electronic device 210 of FIG. 3.

Referring to FIG. 10, in operation 1001, according to various embodiments, the electronic device 200 (e.g., the processor 330a of the electronic device 200) may identify the location information of the external device 210 which is based on the electronic device 200 (e.g., the location information of the external device 210 based on the electronic device 200 identified in operation 801).

In operation 1003, according to various embodiments, the electronic device 200 may receive a second packet (e.g., a packet corresponding to a PRU static signal and/or a packet corresponding to a PRU dynamic signal, received in operation 901) based on a Bluetooth communication connection to the external device 210.

In operation 1005, according to various embodiments, based on charging information of the external device 210 included in the second packet received in operation 1003 and the location information of the external device 210 which is based on the electronic device 200 and is identified in operation 1001, the electronic device 200 may determine the magnitude of charging power to be transmitted via the power transmitter 350a. For example, based on at least one voltage set value (e.g., the minimum voltage value information (VRECT_MIN_DYN) at the latter part of the rectifier of the external device 210, optimal voltage value information (VRECT_SET_DYN) at the latter part of the rectifier of the external device 210, and the maximum voltage value information (VRECT_HIGH_DYN) at the latter part of the rectifier of the external device 210) determined according to a charging situation of the external device 210, and the distance between the external device 210 and the electronic device 200, the electronic device 200 may determine the magnitude of charging power to be transmitted via the power transmitter 350a.

In operation 1007, according to various embodiments, the electronic device 200 may transmit, via the power transmitter 350a, charging power having a magnitude (e.g., a first magnitude) determined in operation 1005.

Figure 11:
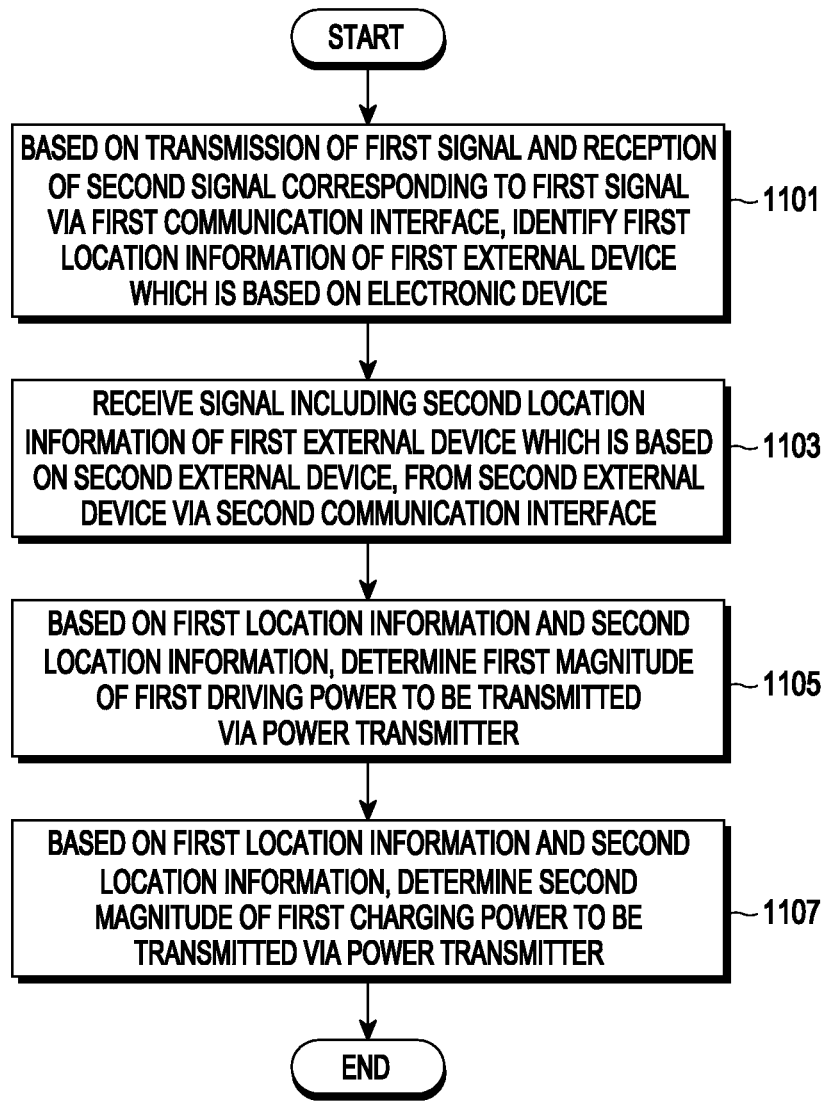
FIG. 11 is a flowchart illustrating an operation method of an electronic device according to various embodiments.
Figure 12:
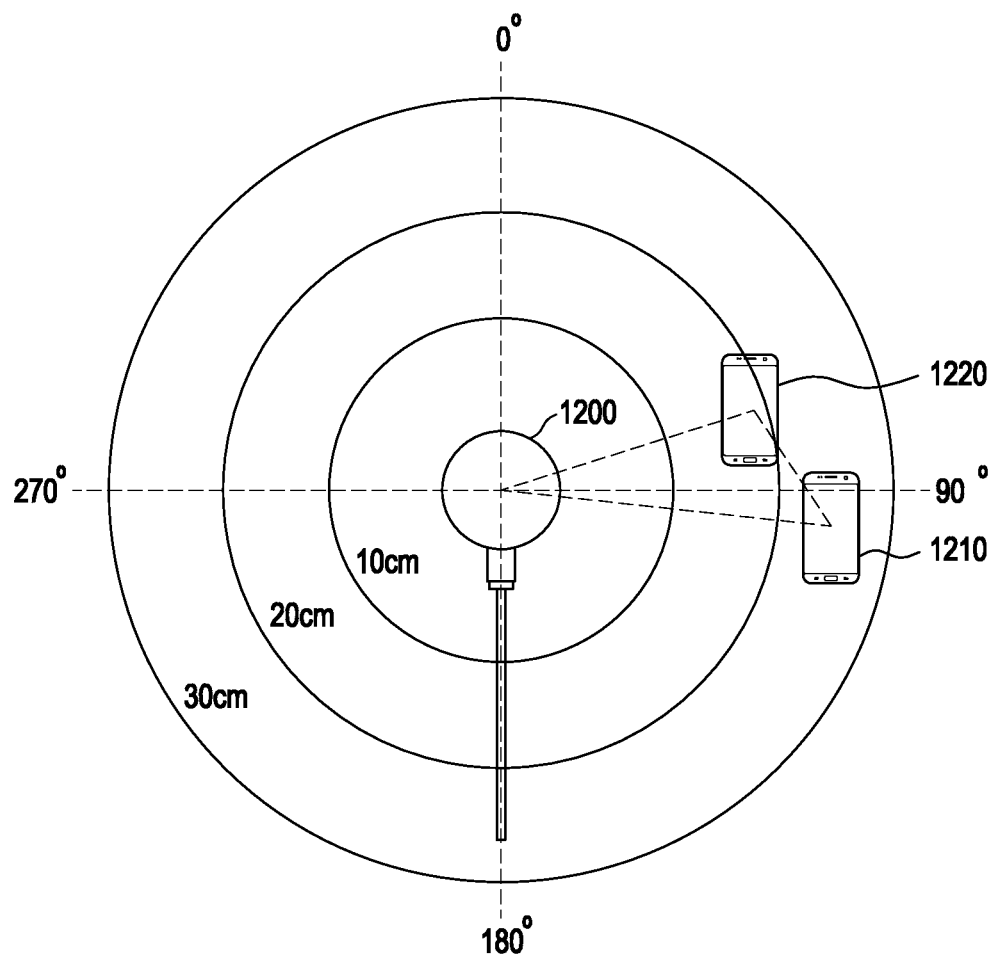
FIG. 12 is a diagram illustrating operation of an electronic device according to various embodiments.

FIG. 11 is a flowchart illustrating an operation method of an electronic device according to various embodiments. FIG. 11 will be described with reference to FIGS. 3 and 12. FIG. 12 is a diagram illustrating operation of an electronic device according to various embodiments. In the description of FIGS. 11 and 12, the electronic device 1200 may be the first electronic device 200 of FIG. 3. In the descriptions of FIG. 11 and FIG. 12, a first external device 1210 and a second external device 1220 may be electronic devices which are the same type of electronic device as the second electronic device 210 of FIG. 3.

Referring to FIG. 11, in operation 1101, according to various embodiments, based on transmission of a first signal via a first communication interface (e.g., the first communication interface 320a of FIG. 3) and reception of a second signal corresponding to the first signal, an electronic device 1200 (e.g., the processor (e.g., the processor 330a of FIG. 3)

of the electronic device 1200) may identify first location information of the first external device 1210 which is based on the electronic device 1200 (e.g., information associated with the distance between the electronic device 1200 and the first external device 1210, and/or information associated with the direction in which the first external device 1210 is located based on the electronic device 1200). For example, the second signal corresponding to the first signal may be a signal (e.g., a response message) transmitted from the first external device 1210 in response to the first signal (e.g., a poll message) transmitted from the electronic device 1200. According to another example embodiment, the second signal corresponding to the first signal may be a signal that is the first signal which is transmitted from the electronic device 1200 and returns by being reflected from the first external device 1210. The descriptions associated with an embodiment in which the electronic device 1200 identifies, based on the first signal and the second signal, the first location information of the first external device 1210 which is based on the electronic device 1200, will be understood in a similar manner as operation 503.

In operation 1103, according to various embodiments, the electronic device 1200 may receive a signal including second location information of the first external device 1210 which is based on the second external device 1220 (e.g., information associated with the distance between the second external device 1220 and the first external device 1210, and/or information associated with the direction in which the first external device 1210 is located based on the second external device 1220), from the second external device 1220 via a second communication interface (e.g., the second communication interface 310a of FIG. 3). For example, the second external device 1220 may identify the location information of the first external device 1210 using a UWB communication interface, and may transmit the identified location information of the first external device 1210 to the electronic device 1220 using a BLE communication interface, but a scheme in which the electronic device 1200 receives a signal including the location information of the first external device 1210 which is based on the second external device 1220 from the second external device 1220 is not limited.

In operation 1105, according to various embodiments, based on the first location information of operation 1101 and the second location information of operation 1103, the electronic device 1200 may determine the magnitude of driving power to be transmitted to the first external device 1210 via a power transmitter (e.g., the power transmitter 350a of FIG. 3). For example, based on the first location information of operation 1101 and the second location information of operation 1103, the electronic device 1200 may determine the magnitude of driving power (e.g., a long-beacon defined in AFA) that is secure for the first external device 1210 to receive enough power to perform bootup and provide a response. For example, based on the first location information of the first external device 1210 identified by the electronic device 1200 and the second location information of the first external device 1210 received from based on the second external device 1220, the electronic device 1200 may identify the spacing between the first external device 1210 and the second external device 1220 and/or the direction in which the first external device 1210 and the second external device 1220 are located based on the electronic device 1200. The electronic device 1200 may determine the magnitude of driving power to be transmitted from the electronic device 1200 to the first external device 1210 by calculating a coupling effect, caused by the second external device 1220, between the electronic device 1200 and the first external device 1210, a power gain of the first external device 1210, and/or a power transmission efficiency.

In operation 1107, according to various embodiments, based on the first location information of operation 1101 and the second location information of operation 1103, the electronic device 1200 may determine the magnitude of charging power to be transmitted to the first external device 1210 via a power transmitter (e.g., the power transmitter 350a of FIG. 3). For example, based on the first location information of operation 1101 and the second location information of operation 1103, the electronic device 1200 may determine the magnitude of power which is transmitted from the electronic device 1200 to the first external device 1210 and is to be used for charging the battery of the first external device 1210. For example, based on the first location information of the first external device 1210 based on the electronic device 1200 and the second location information of the first external device 1210 based on the second external device 1220, the electronic device 1200 may identify the spacing between the first external device 1210 and the second external device 1220 and/or the direction in which the first external device 1210 and the second external device 1220 are located based on the electronic device 1200. Accordingly, the electronic device 1200 may determine the magnitude of charging power to be transmitted from the electronic device 1200 to the first external device 1210 by calculating a coupling effect of the first external device 1210 caused by the second external device 1220, a power gain of the first external device 1210, and/or a power transmission efficiency. In FIG. 11, according to an operation scheme of the electronic device 1200, any one of operation 1105 or operation 1107 may be omitted.

Figure 13:
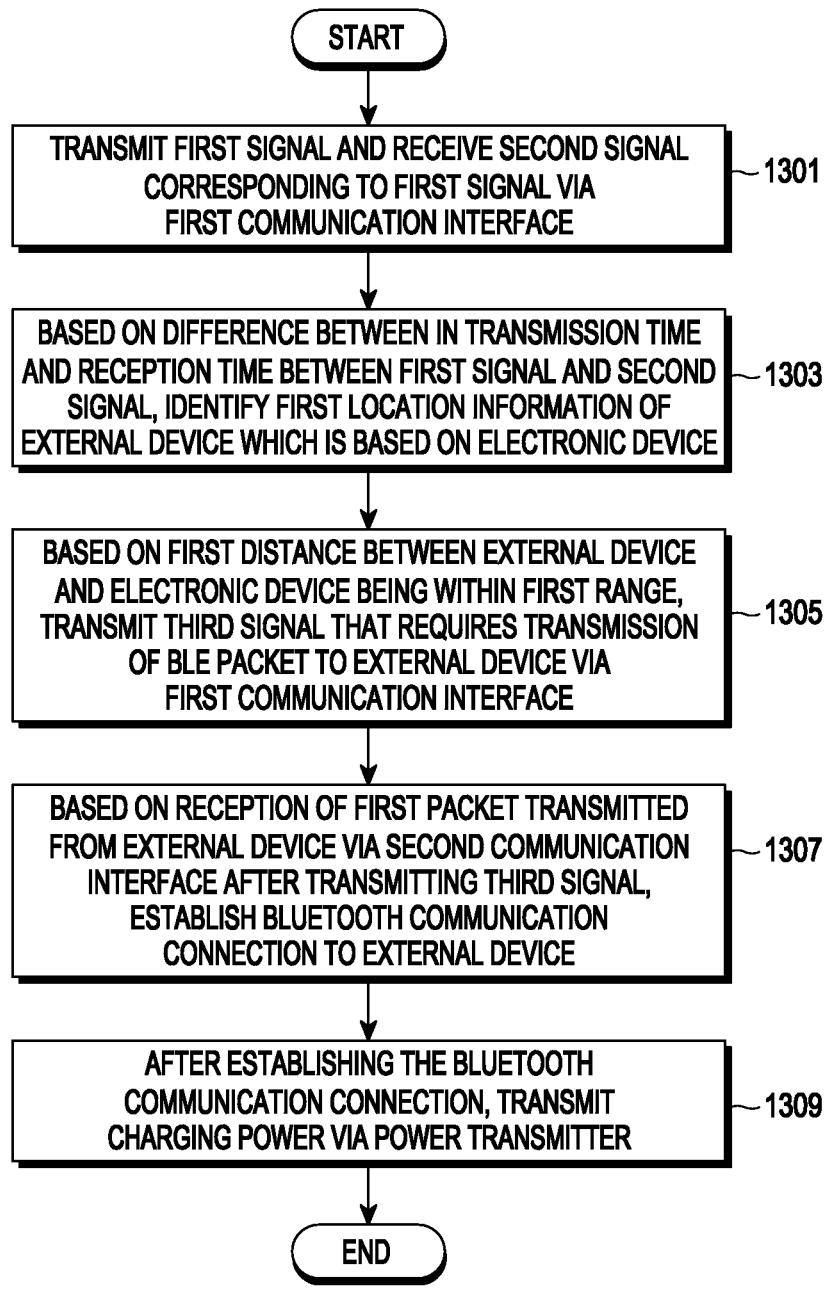
FIG. 13 is a flowchart illustrating an operation method of an electronic device according to various embodiments.

FIG. 13 is a flowchart illustrating an operation method of an electronic device according to various embodiments. FIG. 13 will be described with reference to FIG. 3. In the description of FIG. 13, the electronic device 200 may be the first electronic device 200 of FIG. 3. In the description of FIG. 13, the external device 210 may be the second electronic device 210 of FIG. 3.

Referring to FIG. 13, in operation 1301, according to various embodiments, the electronic device 200 (e.g., the processor 330a of the electronic device 200) may transmit a first signal and may receive a second signal corresponding to the first signal via the first communication interface 320a, as described in operation 501.

In operation 1303, according to various embodiments, based on the difference between transmission time of the first signal and reception time of the second signal, the electronic device 200 may identify location information of the external device 210 which is based on the electronic device 200 (e.g., information associated with the distance between the electronic device 200 and the external device 210 and/or information associated with the direction in which the external device 210 is located based on the electronic device 200), as described in operation 503.

In operation 1305, according to various embodiments, based on the distance (e.g., 40 cm) between the external device 210 and the electronic device 200 being within a predetermined range (e.g., 60 cm or less), the electronic device 200 may transmit a third signal that requires transmission of a BLE packet to the external device 210 via the first communication interface 320a. For example, via the first communication interface 320a that supports a UWB communication scheme, the electronic device 200 may transmit, to the external device 210, the third signal that requires transmission of a Bluetooth advertising packet via a communication interface (e.g., the second communication interface 310b) that supports a Bluetooth communication scheme of the external device 210.

In operation 1307, according to various embodiments, after transmitting the third signal, which includes transmission of a BLE packet to the external device 210 via the first communication interface 320a, the electronic device 200 may establish a Bluetooth communication connection to the external device 210 based on reception of a packet (e.g., a Bluetooth advertising packet) transmitted from the external device 210 via the second communication interface 310a. For example, in response to reception of the Bluetooth advertising packet, the electronic device 200 may transmit a connection request to the external device 210, and accordingly, a Bluetooth communication connection may be established. However, disclosure is not limited to the method illustrated in operation 1307.

In operation 1309, according to various embodiments, the electronic device 200 may transmit charging power via the power transmitter 350a after establishing the Bluetooth communication connection to the external device 210, as described in operation 509. The electronic device 200 may transmit charging power via the power transmitter 350a after performing a procedure of charging based on the Bluetooth communication connection to the external device 210.

Figure 14:
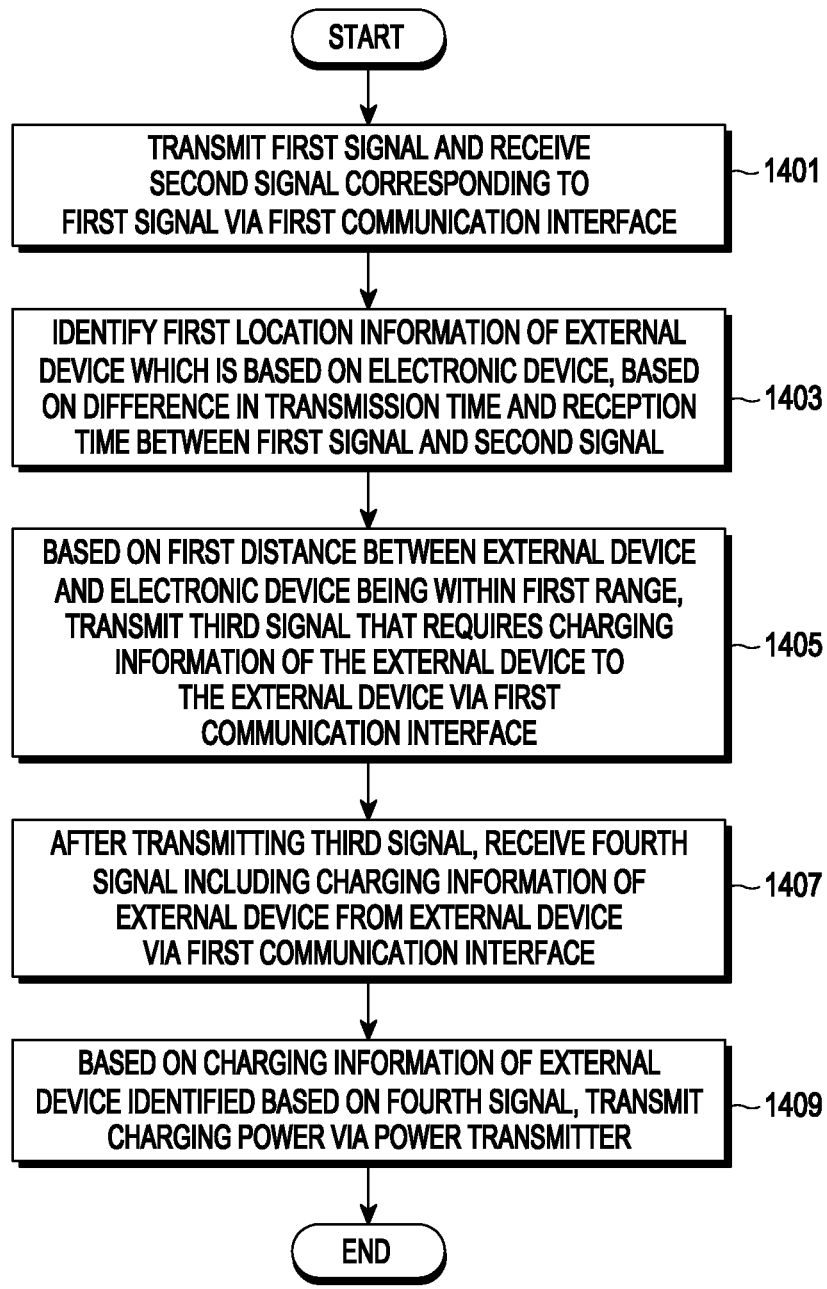
FIG. 14 is a flowchart illustrating an operation method of an electronic device according to various embodiments.

FIG. 14 is a flowchart illustrating an operation method of an electronic device according to various embodiments. FIG. 14 will be described with reference to FIG. 3. In the description of FIG. 14, the electronic device 200 may be the first electronic device 200 of FIG. 3. In the description of FIG. 14, the external device 210 may be the second electronic device 210 of FIG. 3.

Referring to FIG. 14, in operation 1401, according to various embodiments, the electronic device 200 (e.g., the processor 330a of the electronic device 200) may transmit a first signal and may receive a second signal corresponding to the first signal via the first communication interface 320a, as described in operation 501.

In operation 1403, according to various embodiments, based on the difference between transmission time of the first signal and reception time of the second signal, the electronic device 200 may identify location information of the external device 210 which is based on the electronic device 200 (e.g., information associated with the distance between the electronic device 200 and the external device 210 and/or information associated with the direction in which the external device 210 is located based on the electronic device 200), as described in operation 503.

In operation 1405, according to various embodiments, based on the distance (e.g., 40 cm) between the external device 210 and the electronic device 200 being within a predetermined range (e.g., 60 cm or less), the electronic device 200 may transmit, to the external device 210, a third signal that requires transmission of a signal including charging information of the external device 210 via the first communication interface 320a that supports a UWB communication scheme. The charging information of the external device 210 in operation 1405 may correspond to charging information of the external device 210 described in operation 901 of FIG. 9.

In operation 1407, according to various embodiments, the electronic device 200 may receive a fourth signal including charging information of the external device 210 from the external device 210 via the first communication interface 320a, after transmitting, to the external device 210 via the first communication interface 320a, the third signal that requires transmission of a signal including charging information of the external device 210. For example, the external device 210 may transmit the fourth signal including charging information of the external device 210 to the electronic device 200 via the first communication interface 320b that supports a UWB communication scheme, and the electronic device 200 may receive the fourth signal from the external device 210 via the first communication interface 320a that supports the UWB communication scheme.

In operation 1409, according to various embodiments, the electronic device 200 may transmit charging power to the external device 210 via the power transmitter 350a based on the charging information of the external device 210 identified based on the fourth signal received in operation 1407. According to various embodiments, a scheme in which the electronic device 200 determines the magnitude of charging power to be transmitted based on the charging information of the external device 210 may be understood in the same manner as operation 903. Alternatively, a scheme in which, based on the charging information of the external device 210 and the location information of the external device 210, the electronic device 200 determines the magnitude of charging power to be transmitted may be understood in the same manner as operation 1005.

According to various embodiments, the electronic device 200 may include the power transmitter 350a; the first communication interface 320a configured to support a UWB communication scheme; the second communication interface 310a configured to support a Bluetooth communication scheme; and the processor 330a, wherein the processor is configured to control a first communication interface so as to transmit a first signal and to receive a second signal corresponding to the first signal via the first communication interface, to identify, based on the difference between transmission time of the first signal and reception time of the second signal, first location information of a first external device which is based on the electronic device, to control the power transmitter so as to transmit a first driving power having a first magnitude, based on a first distance between the first external device and the electronic device identified based on the first location information being within a first range, to establish a Bluetooth communication connection with the first external device, based on receiving, via the second communication interface, a first packet transmitted from the first external device using the first driving power, after transmitting the first driving power, and to control the power transmitter so as to transmit a first charging power having a second magnitude, after establishing the Bluetooth communication connection.

According to various embodiments, the processor may be configured to control the power transmitter so as to periodically transmit the first driving power having the first magnitude at preset first periods, or to periodically transmit a first detection power having a third magnitude different from the first magnitude at preset second periods, based on a preset first time elapsing in a state in which the second signal is not received after the first signal is transmitted via the first communication interface.

According to various embodiments, the processor may be configured to determine the first magnitude based on the first distance, and to control the power transmitter so as to transmit the first driving power having the determined first magnitude.

According to various embodiments, the processor may be configured to determine the second magnitude based on the first location information, and to control the power transmitter so as to transmit the first charging power having the determined second magnitude.

According to various embodiments, the processor may be configured to receive a second packet via the Bluetooth communication connection after establishing the Bluetooth communication connection with the first external device, and to determine the second magnitude based on first charging information of the first external device included in the second packet.

According to various embodiments, the processor may be configured to determine the second magnitude based on the first charging information of the first external device included in the second packet, and the first location information.

According to various embodiments, the processor may be configured to receive a signal including second location information of the first external device which is based on a second external device, from the second external device via the second communication interface, and to determine the first magnitude based on the first distance and the second location information.

According to various embodiments, the processor may be configured to receive a signal including second location information of the first external device which is based on a second external device, from the second external device via the second communication interface, and to determine the second magnitude based on the first location information and the second location information.

According to various embodiments, the second signal may be a signal transmitted from the first external device in response to the first signal.

According to various embodiments, the second signal may be a reflected signal of the first signal which is reflected from the first external device.

According to various embodiments, an operation method of the electronic device 101 may include an operation of transmitting a first signal and receiving a second signal corresponding to the first signal via the first communication interface 320a that supports a UWB communication scheme, an operation of identifying, based on the difference between transmission time of the first signal and reception time of the second signal, first location information of a first external device which is based on the electronic device, an operation of transmitting a first driving power having a first magnitude via a power transmitter 350a, based on a first distance between the first external device and the electronic device which is identified based on the first location information being within a first range, an operation of establishing a Bluetooth communication connection with the first external device based on reception of a first packet transmitted from the first external device using the first driving power, via a second communication interface 310a that supports a Bluetooth communication scheme, after transmitting the first driving power, and an operation of transmitting a first charging power having a second magnitude via the power transmitter, after establishing the Bluetooth communication connection.

According to various embodiments, the method may further include, based on a preset first time elapsing in a state in which the second signal is not received after the first signal is transmitted via the first communication interface, an operation of periodically transmitting the first driving power having the first magnitude at preset first periods via the power transmitter, or periodically transmitting first detection power having a third magnitude different from the first magnitude at preset second periods via the power transmitter.

According to various embodiments, the method may further include an operation of determining the first magnitude based on the first distance.

According to various embodiments, the method may further include an operation of determining the second magnitude based on the first location information.

According to various embodiments, the method may further include an operation of receiving a second packet via the Bluetooth communication connection after establishing the Bluetooth communication connection with the first external device, and an operation of determining the second magnitude based on first charging information of the first external device included in the second packet.

According to various embodiments, the operation of determining the second magnitude based on first charging information of the first external device included in the second packet may include an operation of determining the second magnitude based on the first charging information of the first external device included in the second packet and the first location information.

According to various embodiments, the method may further include an operation of receiving a signal including second location information of the first external device which is based on a second external device, from the second external device via the second communication interface, wherein the operation of determining the first magnitude based on the first distance may include an operation of determining the first magnitude based on the first distance and the second location information.

According to various embodiments, the method may further include an operation of receiving a signal including second location information of the first external device which is based on a second external device, from the second external device via the second communication interface, wherein the operation of determining the second magnitude based on the first location information may include an operation of determining the second magnitude based on the first location information and the second location information.

According to various embodiments, the second signal may be a signal transmitted from the first external device in response to the first signal.

According to various embodiments, the second signal may be a reflected signal of the first signal which is reflected from the first external device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a power transmitter;
a first communication circuit configured to support an Ultra-Wideband (UWB) communication scheme;
a second communication circuit configured to support a Bluetooth communication scheme;
a processor; and
a memory storing instructions that, when executed by the processor, cause the electronic device to:
control the first communication circuit to transmit a first signal and receive a second signal corresponding to the first signal, the second signal transmitted by a first external device,
identify, based on a difference between a transmission time of the first signal and a reception time of the second signal, a first distance between the first external device and the electronic device,
control the power transmitter to transmit a first driving power having a first magnitude, based on the first distance between the first external device and the electronic device being within a first range,
establish a Bluetooth communication connection with the first external device, based on receiving, via the second communication circuit, a first packet transmitted by the first external device based on the first driving power, after transmitting the first driving power, and
control the power transmitter to transmit a first charging power having a second magnitude, after establishing the Bluetooth communication connection.

2. The electronic device of claim 1, wherein the instructions, when executed by the processor, cause the electronic device to:
control the power transmitter to periodically transmit the first driving power having the first magnitude at first periods, or to periodically transmit a first detection power having a third magnitude different from the first magnitude at second periods, based on a first time elapsing in a state in which the second signal is not received after the first signal is transmitted via the first communication circuit.

3. The electronic device of claim 1, wherein the instructions, when executed by the processor, cause the electronic device to:
determine the first magnitude based on the first distance, and
control the power transmitter to transmit the first driving power having the determined first magnitude.

4. The electronic device of claim 1, wherein the instructions, when executed by the processor, cause the electronic device to:
determine the second magnitude based on the first distance, and
control the power transmitter to transmit the first charging power having the determined second magnitude.

5. The electronic device of claim 1, wherein the instructions, when executed by the processor, cause the electronic device to:
receive a second packet via the Bluetooth communication connection after establishing the Bluetooth communication connection with the first external device, and
determine the second magnitude based on first charging information of the first external device included in the second packet.

6. The electronic device of claim 5, wherein the instructions, when executed by the processor, cause the electronic device to:
determine the second magnitude based on the first distance and first charging information of the first external device included in the second packet.

7. The electronic device of claim 3, wherein the instructions, when executed by the processor, cause the electronic device to:
receive a third signal including information of a second distance between the first external device and a second external device which is based on the second external device, from the second external device via the second communication circuit, and
determine the first magnitude based on the first distance and the second distance.

8. The electronic device of claim 4, wherein the instructions, when executed by the processor, cause the electronic device to:
receive a third signal including information of a second distance between the first external device and a second external device which is based on the second external device, from the second external device via the second communication circuit, and
determine the second magnitude based on the first distance and the second distance.

9. The electronic device of claim 1, wherein the second signal is transmitted from the first external device in response to the first signal.

10. The electronic device of claim 1, wherein the second signal is a reflected signal of the first signal which is reflected from the first external device.

11. A method of operating an electronic device, the method comprising:
transmitting a first signal via a first communication circuit that supports a UWB communication scheme;
receiving a second signal corresponding to the first signal via the first communication circuit, the second signal transmitted by a first external device;
identifying, based on a difference between a transmission time of the first signal and a reception time of the second signal, a first distance between the first external device and the electronic device;
transmitting a first driving power having a first magnitude via a power transmitter, based on the first distance between the first external device and the electronic device being is within a first range;
establishing a Bluetooth communication connection with the first external device based on reception of a first packet transmitted by the first external device based on the first driving power, via a second communication circuit configured to support a Bluetooth communication scheme, after transmitting the first driving power; and
transmitting a first charging power having a second magnitude via the power transmitter, after establishing the Bluetooth communication connection.

12. The method of claim 11, further comprising:
based on a first time elapsing in a state in which the second signal is not received after the first signal is transmitted via the first communication circuit, periodically transmitting the first driving power having the first magnitude at first periods via the power transmitter, or periodically transmitting first detection power having a third magnitude different from the first magnitude at second periods via the power transmitter.

13. The method of claim 11, further comprising determining the first magnitude based on the first distance.

14. The method of claim 11, further comprising determining the second magnitude based on the first distance.

15. The method of claim 11, further comprising:
receiving a second packet via the Bluetooth communication connection after establishing the Bluetooth communication connection with the first external device; and
determining the second magnitude based on first charging information of the first external device included in the second packet.

16. The method of claim 15, wherein the determining of the second magnitude based on the first charging information of the first external device included in the second packet comprises determining the second magnitude based on the first distance and the first charging information of the first external device included in the second packet.

17. The method of claim 13, further comprising:
receiving a third signal including information of a second distance between the first external device and a second external device which is based on the second external device, from the second external device via the second communication circuit,
wherein the determining of the first magnitude based on the first distance comprises determining the first magnitude based on the first distance and the second distance.

18. The method of claim 14, further comprising:
receiving a third signal including information of a second distance between of the first external device and a second external device which is based on the second external device, from the second external device via the second communication circuit,
wherein the determining of the second magnitude based on the first distance comprises determining the second magnitude based on the first distance and the second distance.

19. The method of claim 11, wherein the second signal is transmitted from the first external device in response to the first signal.

20. The method of claim 11, wherein the second signal is a reflected signal of the first signal which is reflected from the first external device.

* * * * *